United States Patent
Izuhara et al.

(10) Patent No.: US 9,432,586 B2
(45) Date of Patent: Aug. 30, 2016

(54) ZOOM LENS SYSTEM, INTERCHANGEABLE LENS APPARATUS AND CAMERA SYSTEM

(71) Applicant: Panasonic Intellectual Property Management Co., Ltd., Osaka (JP)

(72) Inventors: Isamu Izuhara, Osaka (JP); Akihiro Ishida, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/739,282

(22) Filed: Jun. 15, 2015

(65) Prior Publication Data
US 2015/0281588 A1 Oct. 1, 2015

Related U.S. Application Data

(63) Continuation of application No. PCT/JP2012/008137, filed on Dec. 19, 2012.

(51) Int. Cl.
*G02B 15/14* (2006.01)
*H04N 5/232* (2006.01)
(Continued)

(52) U.S. Cl.
CPC .......... *H04N 5/23296* (2013.01); *G02B 13/04* (2013.01); *G02B 15/177* (2013.01); *H04N 5/2252* (2013.01); *H04N 5/2254* (2013.01); *G02B 27/646* (2013.01)

(58) Field of Classification Search
CPC .............................. G02B 15/177; G02B 9/34

USPC .......................................................... 359/686
See application file for complete search history.

(56) References Cited

U.S. PATENT DOCUMENTS 5,585,970 A 12/1996 Shibayama
6,710,931 B1 * 3/2004 Misaka ................ G02B 15/177
359/676
(Continued)

FOREIGN PATENT DOCUMENTS

JP 07-287168 10/1995
JP 2000-338397 12/2000
(Continued)

OTHER PUBLICATIONS

International Search Report issued Feb. 19, 2013 in International (PCT) Application No. PCT/JP2012/008137.

*Primary Examiner* — James Jones
(74) *Attorney, Agent, or Firm* — Wenderoth, Lind & Ponack, L.L.P.

(57) ABSTRACT

A zoom lens system, in order from an object side to an image side, comprising: a negative first lens unit; a positive second lens unit; a negative third lens unit; and a positive fourth lens unit, wherein the first, second and third lens units move along an optical axis in zooming, the third lens unit moves along the optical axis in focusing, and the conditions: $2.5 \leq |(1-(\beta_{3T})^2) \times (\beta_{4T})^2| \leq 7.0$ and $0.5 \leq Bf_W/f_W \leq 4.0$ ($\beta_{3T}$: a lateral magnification of the third lens unit at an infinite object point distance at the telephoto limit, $\beta_{4T}$: a lateral magnification of the fourth lens unit at an infinite object point distance at the telephoto limit, $Bf_W$: a back focal length of the zoom lens system at the wide-angle limit, $f_W$: a focal length of the zoom lens system at the wide-angle limit) are satisfied.

14 Claims, 19 Drawing Sheets

(51) Int. Cl.
    *G02B 15/177*     (2006.01)
    *G02B 13/04*     (2006.01)
    *H04N 5/225*     (2006.01)
    *G02B 27/64*     (2006.01)

(56) References Cited

U.S. PATENT DOCUMENTS

2007/0109662 A1    5/2007   Ohno
2008/0231968 A1    9/2008   Souma
2010/0053767 A1    3/2010   Katakura
2012/0019931 A1    1/2012   Ogata et al.
2012/0162777 A1    6/2012   Imaoka

FOREIGN PATENT DOCUMENTS

| | | |
|---|---|---|
| JP | 2001-343584 | 12/2001 |
| JP | 2007-156367 | 6/2007 |
| JP | 2008-233611 | 10/2008 |
| JP | 2010-054722 | 3/2010 |
| JP | 2011-170371 | 9/2011 |
| JP | 2012-027262 | 2/2012 |
| JP | 2012-133228 | 7/2012 |

* cited by examiner

ZOOM LENS SYSTEM, INTERCHANGEABLE LENS APPARATUS AND CAMERA SYSTEM

CROSS-REFERENCE TO RELATED APPLICATION

This application is a Continuation of International Application No. PCT/JP2012/008137, filed on Dec. 19, 2012, the disclosures of which Application is incorporated by reference herein.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length without the necessity of lens replacement.

Zoom lens systems having excellent optical performance from a wide-angle limit to a telephoto limit have been desired as zoom lens systems to be used in interchangeable lens apparatuses. For example, various kinds of zoom lens systems, having a multiple-unit configuration in which a negative lens unit is located closest to an object side, have been proposed.

Japanese Laid-Open Patent Publications Nos. 2012-027262, 2011-170371, and 2010-054722 each discloses a lens system having a four-unit configuration of negative, positive, negative, and positive, in which the first to third lens units move along the optical axis in zooming, and focusing is performed by the third lens unit or the fourth lens unit.

Japanese Laid-Open Patent Publication No. 2008-233611 discloses a lens system having a four-unit configuration of negative, positive, negative, and positive, in which at least the second lens unit and the third lens unit move along the optical axis in zooming, and focusing is performed by the third lens unit.

Japanese Laid-Open Patent Publication No. 2001-343584 discloses a lens system having a four-unit configuration of negative, positive, negative, and positive, in which the first lens unit and the second lens unit move along the optical axis in zooming, and focusing is performed by the third lens unit.

SUMMARY

The present disclosure provides a compact and light-weight zoom lens system having high resolution from a wide-angle limit to a telephoto limit, and excellent optical performance, in which the amount of movement of lens units for focusing is small and fluctuations in the angle of view during wobbling are suppressed, so that the zoom lens system is suitably applicable to a camera system intended to take a moving image. Further, the present disclosure provides an interchangeable lens apparatus and a camera system each employing the zoom lens system.

(I) The novel concepts disclosed herein were achieved in order to solve the foregoing problems in the related art, and herein is disclosed:

a zoom lens system, in order from an object side to an image side, comprising:
a first lens unit having negative optical power;
a second lens unit having positive optical power;
a third lens unit having negative optical power; and
a fourth lens unit having positive optical power, wherein
the first lens unit, the second lens unit, and the third lens unit move along an optical axis in zooming from a wide-angle limit to a telephoto limit at a time of image taking,
the third lens unit moves along the optical axis in focusing from an infinity in-focus condition to a close-object in-focus condition, and
the following conditions (1) and (2) are satisfied:

$$2.5 \leq |(1-(\beta_{3T})^2) \times (\beta_{4T})^2| \leq 7.0 \quad (1)$$

$$0.5 \leq Bf_W/f_W \leq 4.0 \quad (2)$$

where
$\beta_{3T}$ is a lateral magnification of the third lens unit at an infinite object point distance, at the telephoto limit, $\beta_{4T}$ is a lateral magnification of the fourth lens unit at an infinite object point distance, at the telephoto limit,
$Bf_W$ is a back focal length of the zoom lens system at the wide-angle limit, and $f_W$ is a focal length of the zoom lens system at the wide-angle limit.

The novel concepts disclosed herein were achieved in order to solve the foregoing problems in the related art, and herein is disclosed:

an interchangeable lens apparatus comprising:
a zoom lens system; and
a lens mount section which is connectable to a camera body including an image sensor for receiving an optical image formed by the zoom lens system and converting the optical image into an electric image signal,
the zoom lens system, in order from an object side to an image side, comprising:
a first lens unit having negative optical power;
a second lens unit having positive optical power;
a third lens unit having negative optical power; and
a fourth lens unit having positive optical power, wherein
the first lens unit, the second lens unit, and the third lens unit move along an optical axis in zooming from a wide-angle limit to a telephoto limit at a time of image taking,
the third lens unit moves along the optical axis in focusing from an infinity in-focus condition to a close-object in-focus condition, and
the following conditions (1) and (2) are satisfied:

$$2.5 \leq |(1-(\beta_{3T})^2) \times (\beta_{4T})^2| \leq 7.0 \quad (1)$$

$$0.5 \leq Bf_W/f_W \leq 4.0 \quad (2)$$

where
$\beta_{3T}$ is a lateral magnification of the third lens unit at an infinite object point distance, at the telephoto limit,
$\beta_{4T}$ is a lateral magnification of the fourth lens unit at an infinite object point distance, at the telephoto limit,
$Bf_W$ is a back focal length of the zoom lens system at the wide-angle limit, and $f_W$ is a focal length of the zoom lens system at the wide-angle limit The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, the zoom lens system, in order from an object side to an image side, comprising:

a first lens unit having negative optical power;
a second lens unit having positive optical power;
a third lens unit having negative optical power; and
a fourth lens unit having positive optical power, wherein the first lens unit, the second lens unit, and the third lens unit move along an optical axis in zooming from a wide-angle limit to a telephoto limit at a time of image taking, the third lens unit moves along the optical axis in focusing from an infinity in-focus condition to a close-object in-focus condition, and the following conditions (1) and (2) are satisfied:

$$2.5 \le |(1-(\beta_{3T})^2) \times (\beta_{4T})^2| 7.0 \quad (1)$$

$$0.5 \le Bf_W/f_W \le 4.0 \quad (2)$$

where $\beta_{3T}$ is a lateral magnification of the third lens unit at an infinite object point distance, at the telephoto limit, $\beta_{4T}$ is a lateral magnification of the fourth lens unit at an infinite object point distance, at the telephoto limit, $Bf_W$ is a back focal length of the zoom lens system at the wide-angle limit, and $f_W$ is a focal length of the zoom lens system at the wide-angle limit (II) The novel concepts disclosed herein were achieved in order to solve the foregoing problems in the related art, and herein is disclosed:

a zoom lens system, in order from an object side to an image side, comprising:

a first lens unit having negative optical power;
a second lens unit having positive optical power;
a third lens unit having negative optical power; and
a fourth lens unit having positive optical power, wherein
the third lens unit is composed of one lens element, the first lens unit, the second lens unit, and the third lens unit move along an optical axis in zooming from a wide-angle limit to a telephoto limit at a time of image taking, the third lens unit moves from the object side to the image side along the optical axis in focusing from an infinity in-focus condition to a close-object in-focus condition, and the following conditions (2), (3), and (4) are satisfied:

$$0.5 \le Bf_W/f_W \le 4.0 \quad (2)$$

$$vd_3 \le 40.0 \quad (3)$$

$$0.3 \le |M_3/f_W| \le 1.3 \quad (4)$$

where $Bf_W$ is a back focal length of the zoom lens system at the wide-angle limit, $vd_3$ is an Abbe number to a d-line of the lens element constituting the third lens unit, $M_3$ is an amount of movement of the third lens unit in zooming from the wide-angle limit to the telephoto limit at the time of image taking, and $f_W$ is a focal length of the zoom lens system at the wide-angle limit The novel concepts disclosed herein were achieved in order to solve the foregoing problems in the related art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal, the zoom lens system, in order from an object side to an image side, comprising:

a first lens unit having negative optical power;
a second lens unit having positive optical power;
a third lens unit having negative optical power; and
a fourth lens unit having positive optical power, wherein
the third lens unit is composed of one lens element, the first lens unit, the second lens unit, and the third lens unit move along an optical axis in zooming from a wide-angle limit to a telephoto limit at a time of image taking, the third lens unit moves from the object side to the image side along the optical axis in focusing from an infinity in-focus condition to a close-object in-focus condition, and the following conditions (2), (3), and (4) are satisfied:

$$0.5 \le Bf_W/f_W \le 4.0 \quad (2)$$

$$vd_3 \le 40.0 \quad (3)$$

$$0.3 \le |M_3/f_W| \le 1.3 \quad (4)$$

where $Bf_W$ is a back focal length of the zoom lens system at the wide-angle limit, $vd_3$ is an Abbe number to a d-line of the lens element constituting the third lens unit, $M_3$ is an amount of movement of the third lens unit in zooming from the wide-angle limit to the telephoto limit at the time of image taking, and $f_W$ is a focal length of the zoom lens system at the wide-angle limit The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, the zoom lens system, in order from an object side to an image side, comprising:

a first lens unit having negative optical power;
a second lens unit having positive optical power;
a third lens unit having negative optical power; and
a fourth lens unit having positive optical power, wherein
the third lens unit is composed of one lens element, the first lens unit, the second lens unit, and the third lens unit move along an optical axis in zooming from a wide-angle limit to a telephoto limit at a time of image taking, the third lens unit moves from the object side to the image side along the optical axis in focusing from an infinity in-focus condition to a close-object in-focus condition, and the following conditions (2), (3), and (4) are satisfied:

$$0.5 \le Bf_W/f_W \le 4.0 \quad (2)$$

$$vd_3 \le 40.0 \quad (3)$$

$$0.3 \le |M_3/f_W| 1.3 \quad (4)$$

where $Bf_W$ is a back focal length of the zoom lens system at the wide-angle limit, $vd_3$ is an Abbe number to a d-line of the lens element constituting the third lens unit, $M_3$ is an amount of movement of the third lens unit in zooming from the wide-angle limit to the telephoto limit at the time of image taking, and $f_W$ is a focal length of the zoom lens system at the wide-angle limit The zoom lens system according to the present disclosure has high resolution from a wide-angle limit to a telephoto limit, and excellent optical performance. Moreover, the zoom lens system has a small amount of movement of lens units for focusing, is compact and lightweight, has less fluctuations in the angle of view during wobbling, and therefore, is suitably applicable to a camera system intended to take a moving image.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
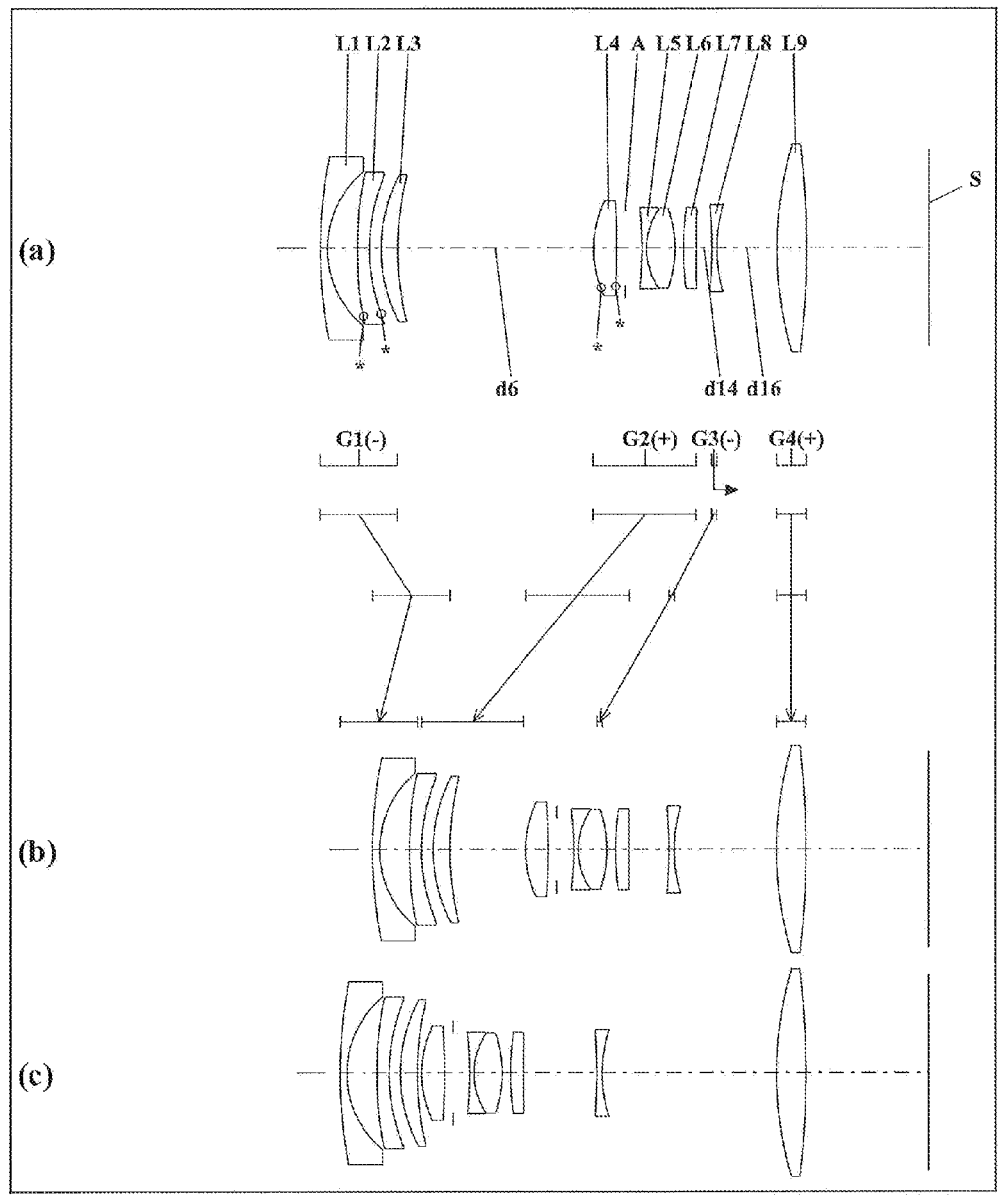
FIG. 1 is a lens arrangement diagram showing an infinity in-focus condition of a zoom lens system according to Embodiment 1 (Numerical Example 1)
Figure 2:
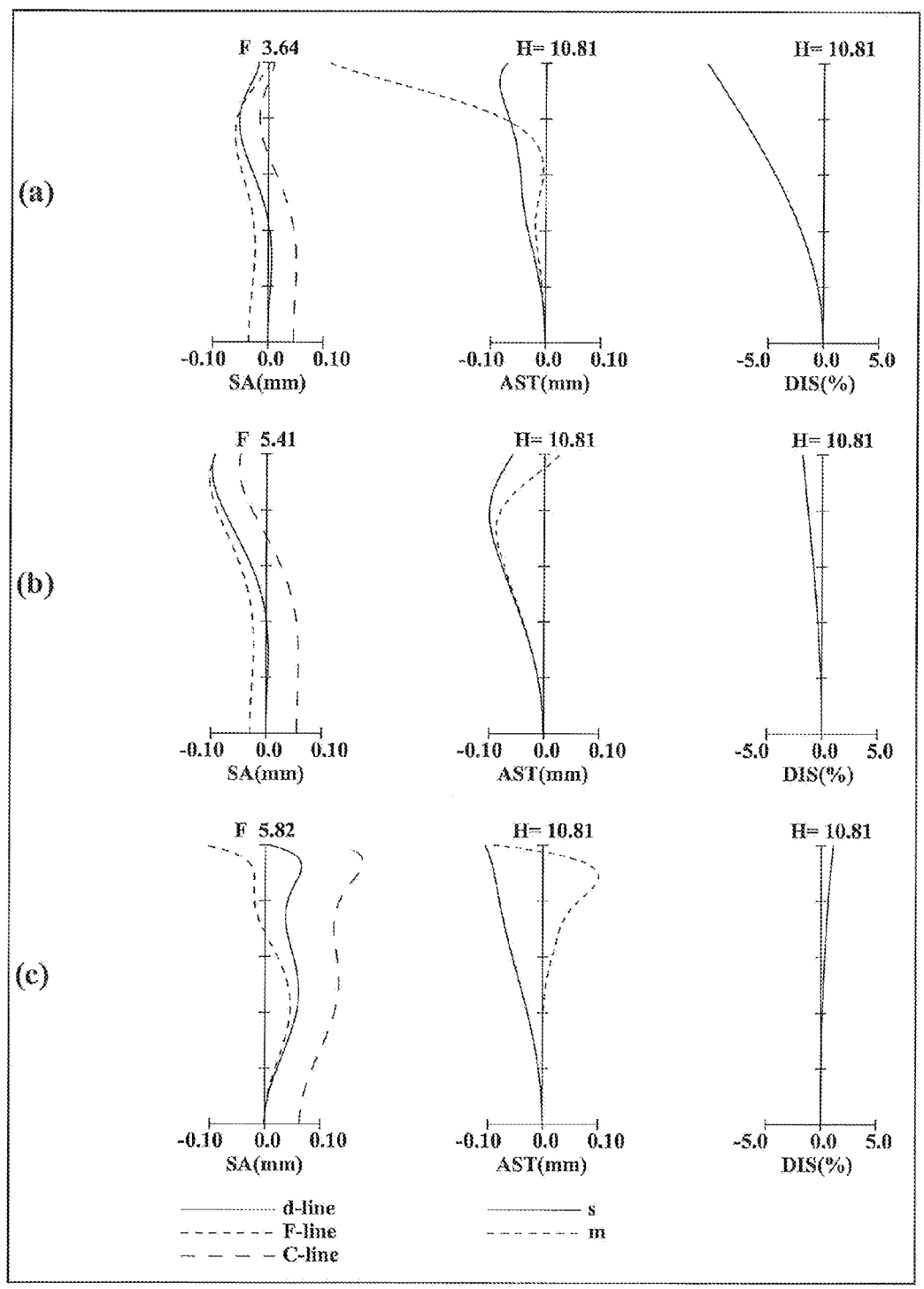
FIG. 2 is a longitudinal aberration diagram of an infinity in-focus condition of the zoom lens system according to Numerical Example 1.
Figure 3:
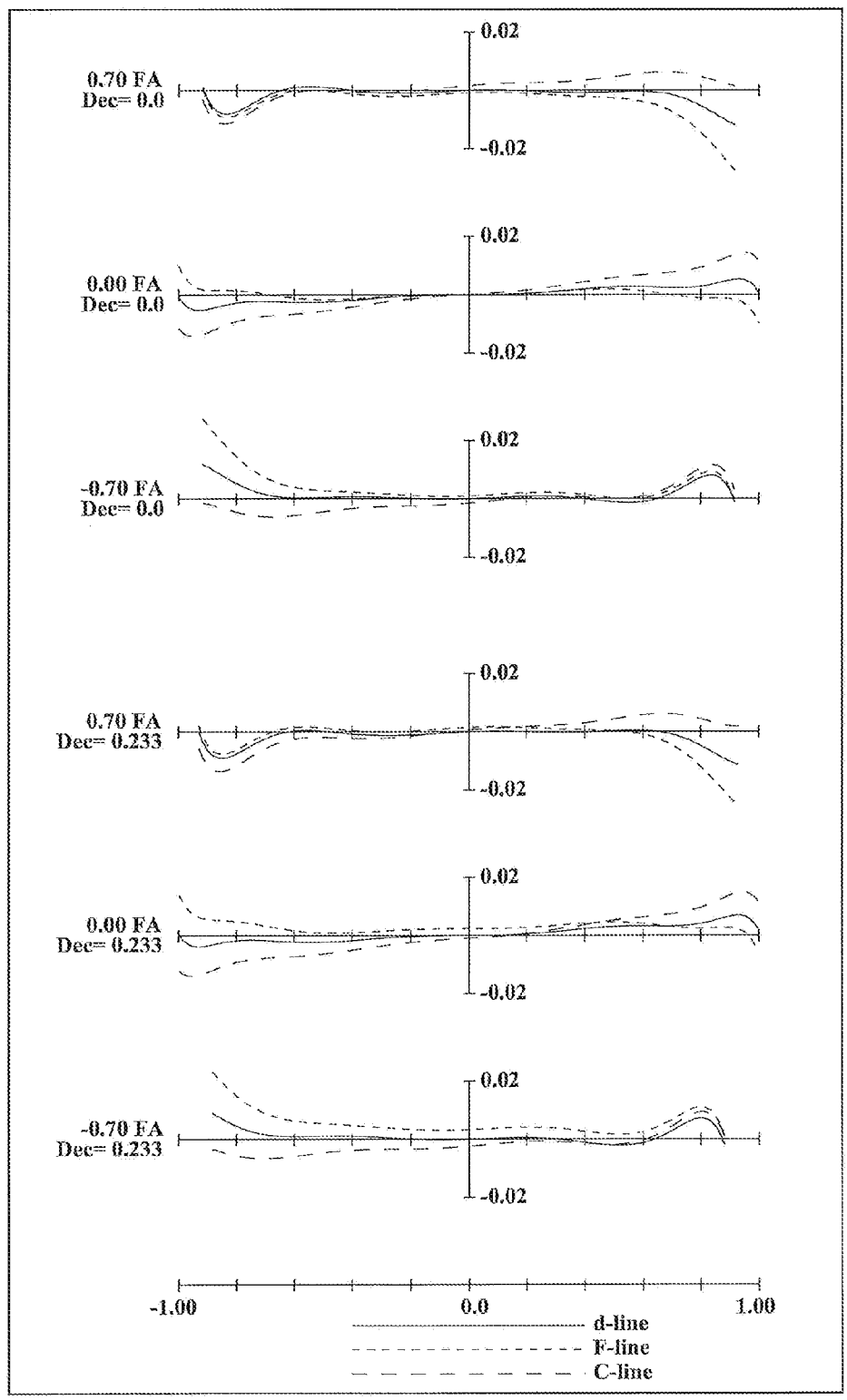
FIG. 3 is a lateral aberration diagram of the zoom lens system according to Numerical Example 1 at a telephoto limit in a basic state where image blur compensation is not performed and in an image blur compensation state.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 6

FIGS. 1, 4, 7, 10, 13 and 16 are lens arrangement diagrams of zoom lens systems according to Embodiments 1 to 6, respectively. Each zoom lens system is in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). In each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit.

Further, in each Fig., an arrow imparted to a lens unit indicates focusing from an infinity in-focus condition to a close-object in-focus condition. That is, in FIGS. 1, 4, 7, 10, 13 and 16, the arrow indicates a direction along which a third lens unit G3 described later moves in focusing from the infinity in-focus condition to the close-object in-focus condition. In FIGS. 1, 4, 7, 10, 13 and 16, since the symbols of the respective lens units are imparted to part (a), the arrow indicating focusing is placed beneath each symbol of each lens unit for the convenience sake. However, the direction along which each lens unit moves in focusing in each zooming condition will be hereinafter described in detail for each embodiment.

Each of the zoom lens systems according to Embodiments 1 to 6, in order from the object side to the image side, comprises a first lens unit G1 having negative optical power, a second lens unit G2 having positive optical power, a third lens unit G3 having negative optical power, and a fourth lens unit G4 having positive optical power. In the zoom lens systems according to Embodiments 1 to 6, in zooming, the first lens unit G1, the second lens unit G2, and the third lens unit G3 individually move in a direction along the optical axis such that the intervals between the respective lens units, that is, the interval between the first lens unit G1 and the second lens unit G2, the interval between the second lens unit G2 and the third lens unit G3, and the interval between the third lens unit G3 and the fourth lens unit G4, vary. In the zoom lens systems according to Embodiments 1 to 6, these lens units are arranged in a desired optical power allocation, whereby size reduction of the entire lens system is achieved while maintaining excellent optical performance.

In FIGS. 1, 4, 7, 10, 13 and 16, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

Embodiment 1

As shown in FIG. 1, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces. The second lens element L2 is made of a material including, as a principal component, an olefin resin.

The second lens unit G2, in order from the object side to the image side, comprises: a bi-convex fourth lens element L4; a bi-concave fifth lens element L5; a bi-convex sixth lens element L6; and a positive meniscus seventh lens element L7 with the convex surface facing the object side. Among these, the fifth lens element L5 and the sixth lens element L6 are cemented with each other. The fourth lens element L4 has two aspheric surfaces. An aperture diaphragm A is provided between the fourth lens element L4 and the fifth lens element L5. The aperture diaphragm A moves along the optical axis together with the second lens unit G2 in zooming from a wide-angle limit to a telephoto limit at the time of image taking.

Among the lens elements constituting the second lens unit G2, the seventh lens element L7 corresponds to an image blur compensating lens unit described later which moves in a direction perpendicular to the optical axis to optically compensate image blur.

The third lens unit G3 comprises solely a bi-concave eighth lens element L8.

The fourth lens unit G4 comprises solely a bi-convex ninth lens element L9.

In zooming from the wide-angle limit to the telephoto limit at the time of image taking, the first lens unit G1 moves with locus of a convex to the image side, the second lens unit G2 and the third lens unit G3 monotonically move to the object side, and the fourth lens unit G4 is fixed with respect to the image surface S. That is, in zooming, the first lens unit G1, the second lens unit G2, and the third lens unit G3 individually move along the optical axis so that the interval between the first lens unit G1 and the second lens unit G2 decreases, the interval between the second lens unit G2 and the third lens unit G3 varies, and the interval between the third lens unit G3 and the fourth lens unit G4 increases.

In focusing from the infinity in-focus condition to the close-object in-focus condition, the third lens unit G3 moves to the image side along the optical axis in any zooming condition.

Embodiment 2

Figure 4:
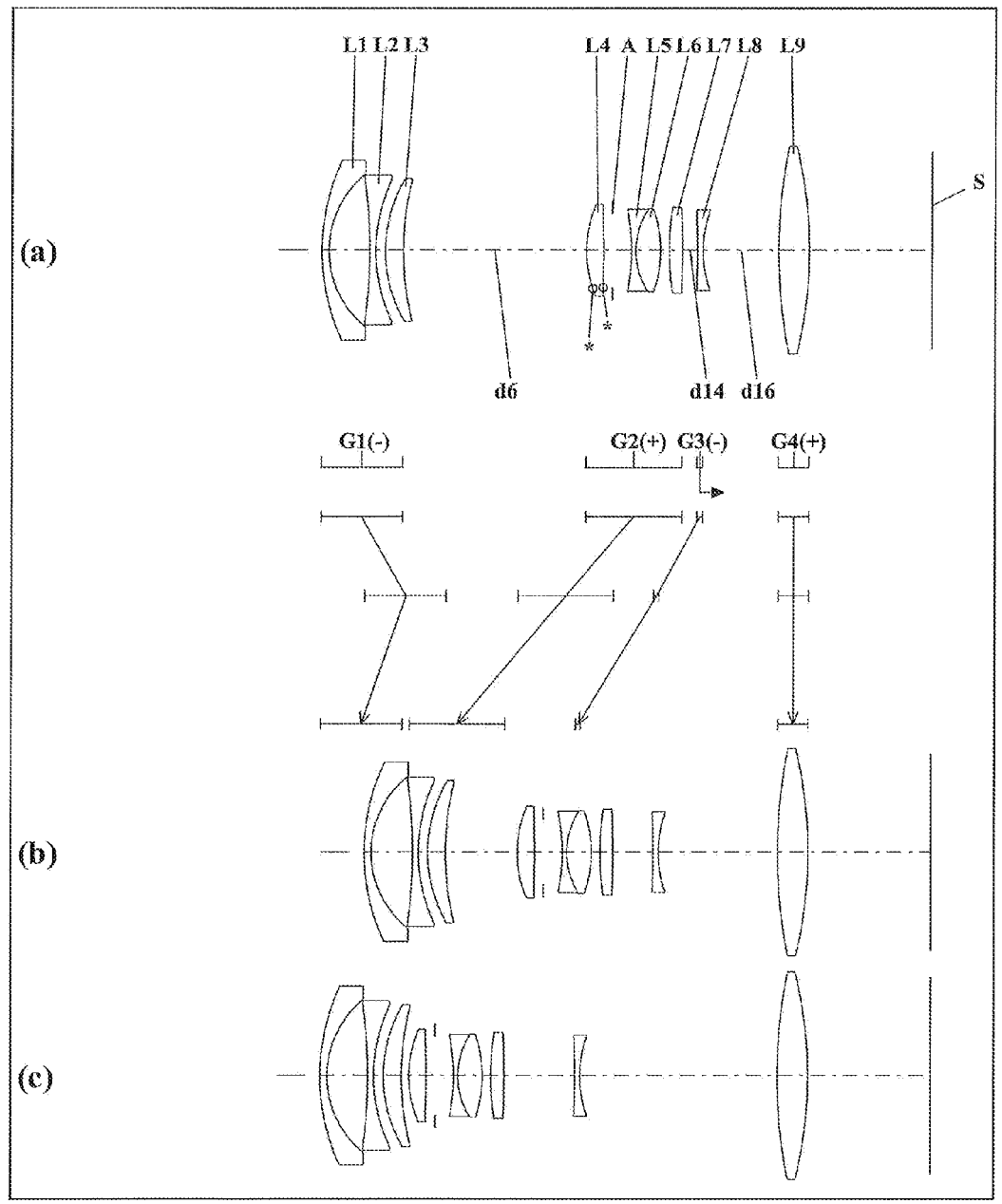
FIG. 4 is a lens arrangement diagram showing an infinity in-focus condition of a zoom lens system according to Embodiment 2 (Numerical Example 2)
Figure 5:
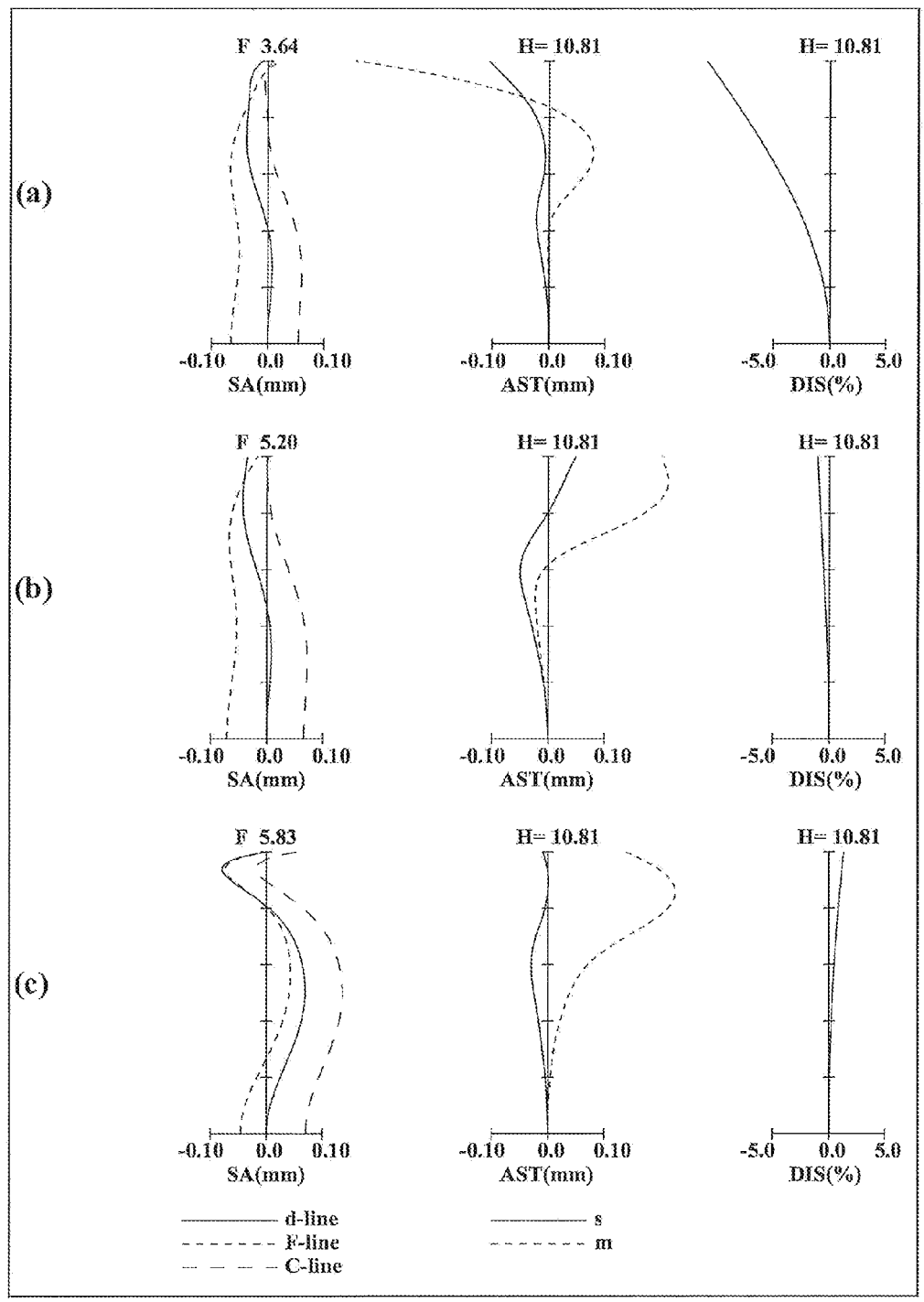
FIG. 5 is a longitudinal aberration diagram of an infinity in-focus condition of the zoom lens system according to Numerical Example 2.
Figure 6:
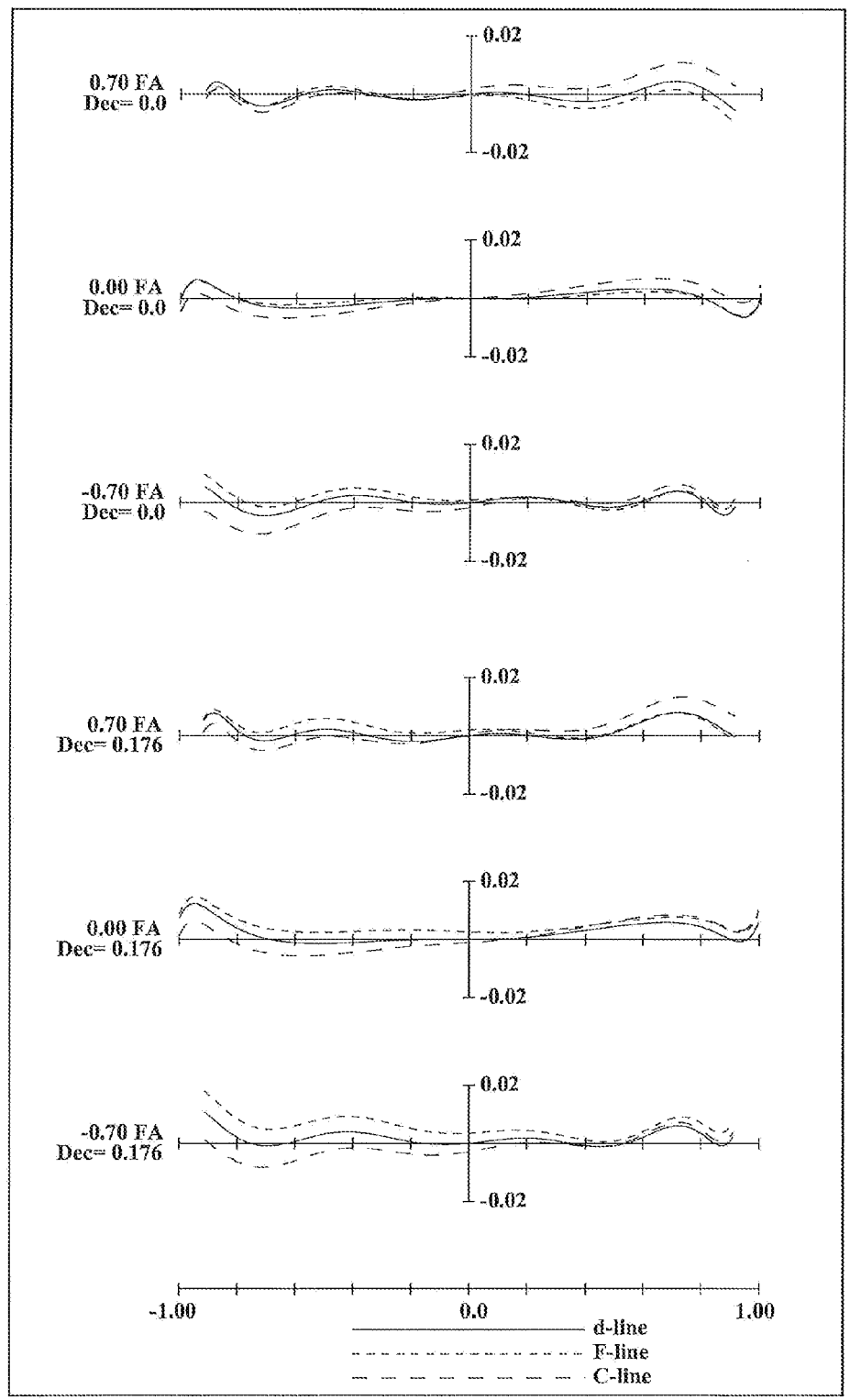
FIG. 6 is a lateral aberration diagram of the zoom lens system according to Numerical Example 2 at a telephoto limit in a basic state where image blur compensation is not performed and in an image blur compensation state.

As shown in FIG. 4, the first lens unit G1, in order from the object side to the image side, comprises: a negative meniscus first lens element L1 with the convex surface facing the object side; a bi-concave second lens element L2; and a positive meniscus third lens element L3 with the convex surface facing the object side.

The second lens unit G2, in order from the object side to the image side, comprises: a bi-convex fourth lens element L4; a bi-concave fifth lens element L5; a bi-convex sixth lens element L6; and a bi-convex seventh lens element L7. Among these, the fifth lens element L5 and the sixth lens element L6 are cemented with each other. The fourth lens element L4 has two aspheric surfaces. An aperture diaphragm A is provided between the fourth lens element L4 and the fifth lens element L5. The aperture diaphragm A moves along the optical axis together with the second lens unit G2 in zooming from a wide-angle limit to a telephoto limit at the time of image taking.

Among the lens elements constituting the second lens unit G2, the seventh lens element L7 corresponds to an image blur compensating lens unit described later which moves in a direction perpendicular to the optical axis to optically compensate image blur.

The third lens unit G3 comprises solely a bi-concave eighth lens element L8.

The fourth lens unit G4 comprises solely a bi-convex ninth lens element L9.

In zooming from the wide-angle limit to the telephoto limit at the time of image taking, the first lens unit G1 moves with locus of a convex to the image side, the second lens unit G2 and the third lens unit G3 monotonically move to the object side, and the fourth lens unit G4 is fixed with respect to the image surface S. That is, in zooming, the first lens unit G1, the second lens unit G2, and the third lens unit G3 individually move along the optical axis so that the interval between the first lens unit G1 and the second lens unit G2 decreases, the interval between the second lens unit G2 and the third lens unit G3 varies, and the interval between the third lens unit G3 and the fourth lens unit G4 increases.

In focusing from the infinity in-focus condition to the close-object in-focus condition, the third lens unit G3 moves to the image side along the optical axis in any zooming condition.

Embodiment 3

Figure 7:
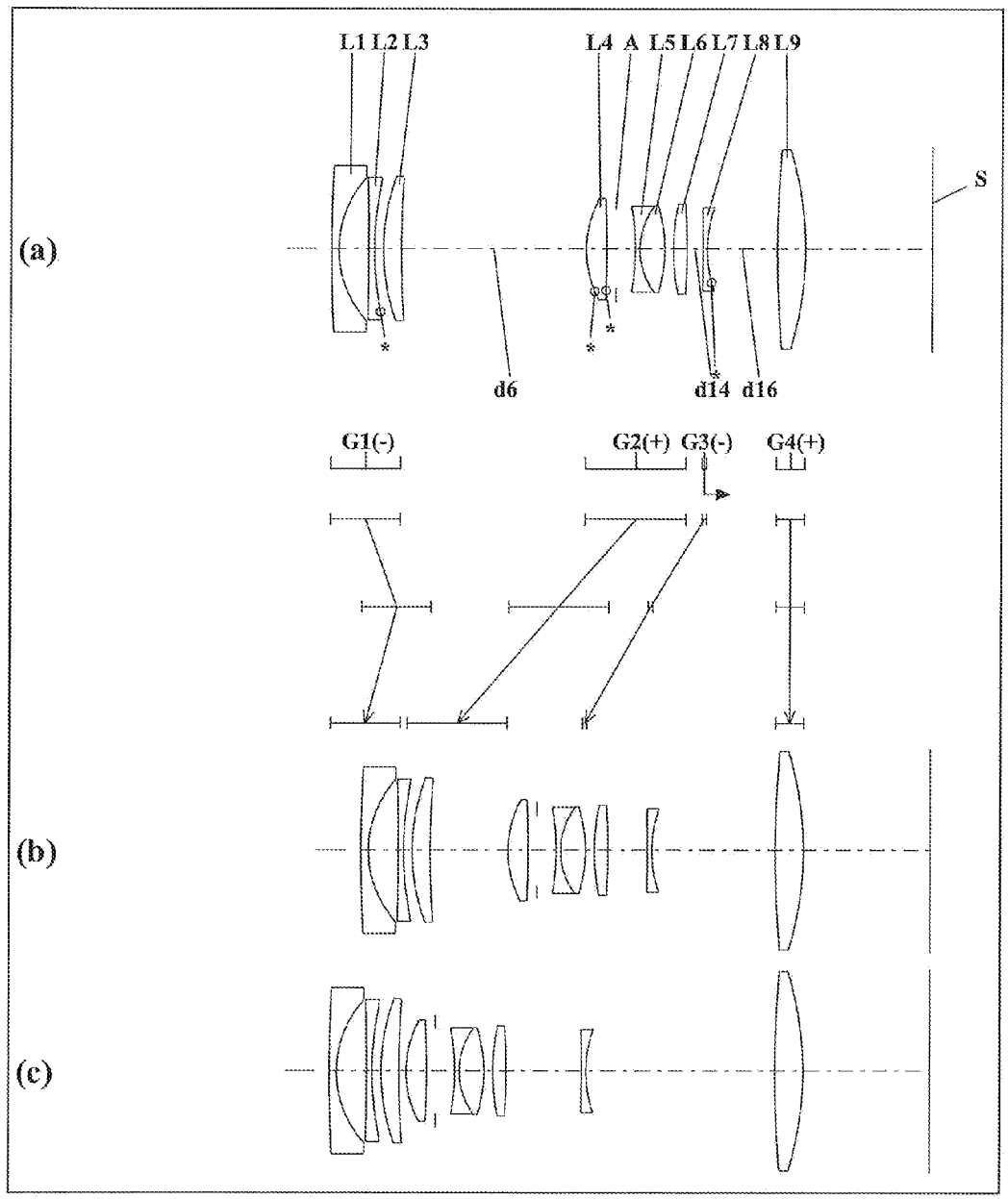
FIG. 7 is a lens arrangement diagram showing an infinity in-focus condition of a zoom lens system according to Embodiment 3 (Numerical Example 3)
Figure 8:
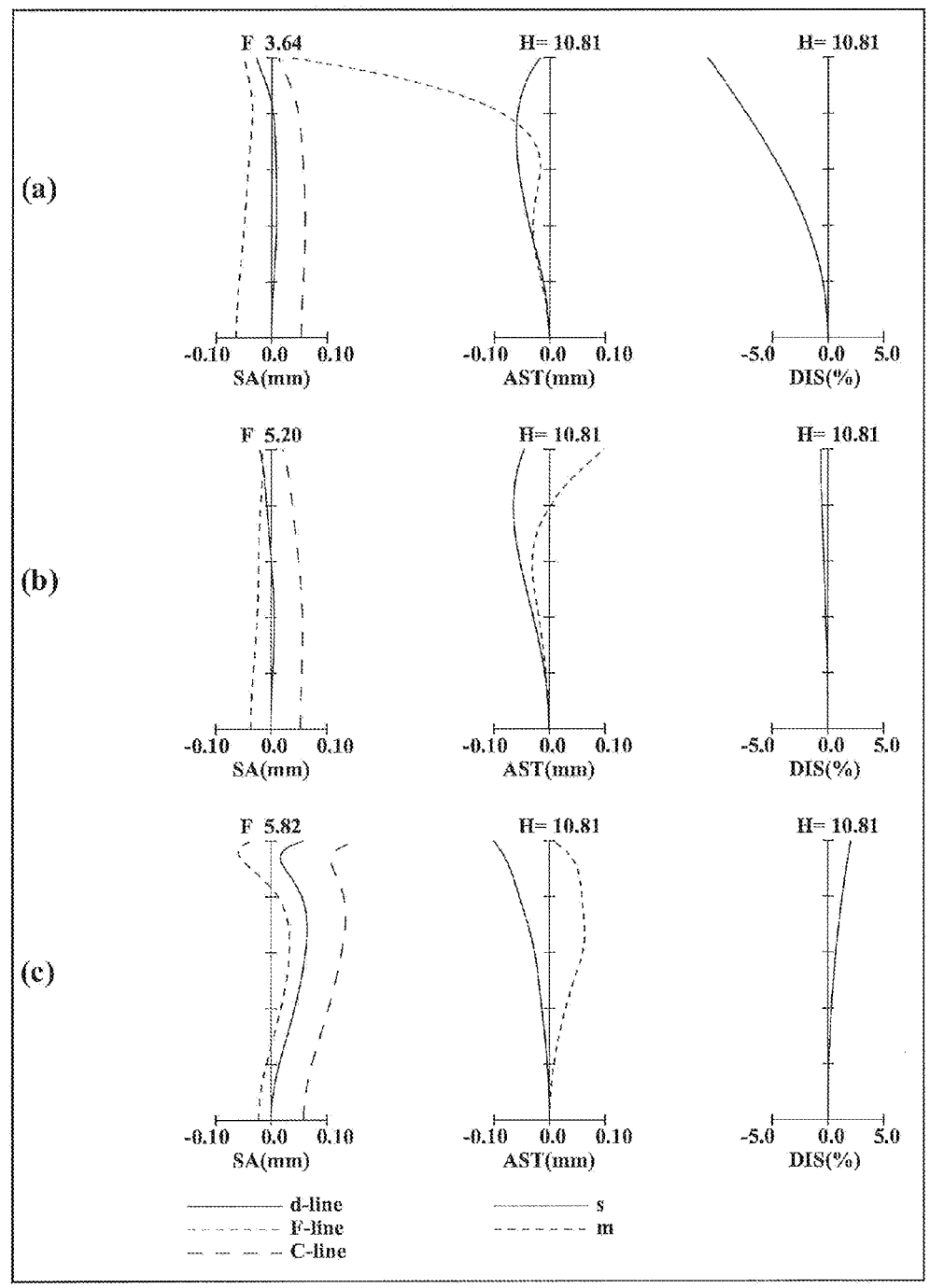
FIG. 8 is a longitudinal aberration diagram of an infinity in-focus condition of the zoom lens system according to Numerical Example 3.
Figure 9:
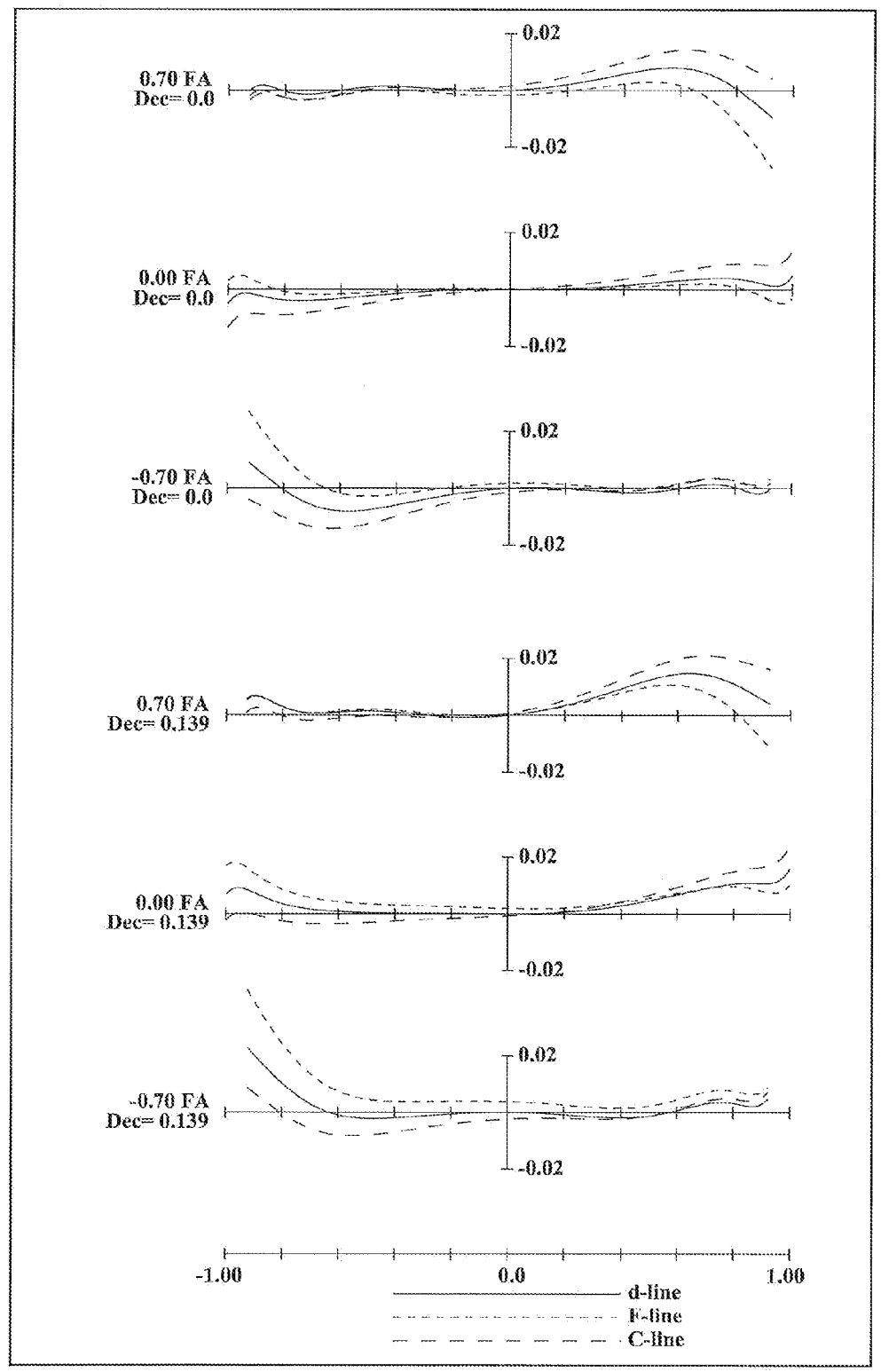
FIG. 9 is a lateral aberration diagram of the zoom lens system according to Numerical Example 3 at a telephoto limit in a basic state where image blur compensation is not performed and in an image blur compensation state.

As shown in FIG. 7, the first lens unit G1, in order from the object side to the image side, comprises: a negative meniscus first lens element L1 with the convex surface facing the object side; a bi-concave second lens element L2; and a positive meniscus third lens element L3 with the convex surface facing the object side. Among these, the second lens element L2 has an aspheric image side surface.

The second lens unit G2, in order from the object side to the image side, comprises: a bi-convex fourth lens element L4; a bi-concave fifth lens element L5; a bi-convex sixth lens element L6; and a bi-convex seventh lens element L7. Among these, the fifth lens element L5 and the sixth lens element L6 are cemented with each other. The fourth lens element L4 has two aspheric surfaces. An aperture diaphragm A is provided between the fourth lens element L4 and the fifth lens element L5. The aperture diaphragm A moves along the optical axis together with the second lens unit G2 in zooming from a wide-angle limit to a telephoto limit at the time of image taking.

Among the lens elements constituting the second lens unit G2, the seventh lens element L7 corresponds to an image blur compensating lens unit described later which moves in a direction perpendicular to the optical axis to optically compensate image blur.

The third lens unit G3 comprises solely a bi-concave eighth lens element L8. The eighth lens element L8 has an aspheric image side surface.

The fourth lens unit G4 comprises solely a bi-convex ninth lens element L9.

In zooming from the wide-angle limit to the telephoto limit at the time of image taking, the first lens unit G1 moves with locus of a convex to the image side, the second lens unit G2 and the third lens unit G3 monotonically move to the object side, and the fourth lens unit G4 is fixed with respect to the image surface S. That is, in zooming, the first lens unit G1, the second lens unit G2, and the third lens unit G3 individually move along the optical axis so that the interval between the first lens unit G1 and the second lens unit G2 decreases, the interval between the second lens unit G2 and the third lens unit G3 varies, and the interval between the third lens unit G3 and the fourth lens unit G4 increases.

In focusing from the infinity in-focus condition to the close-object in-focus condition, the third lens unit G3 moves to the image side along the optical axis in any zooming condition.

Embodiment 4

Figure 10:
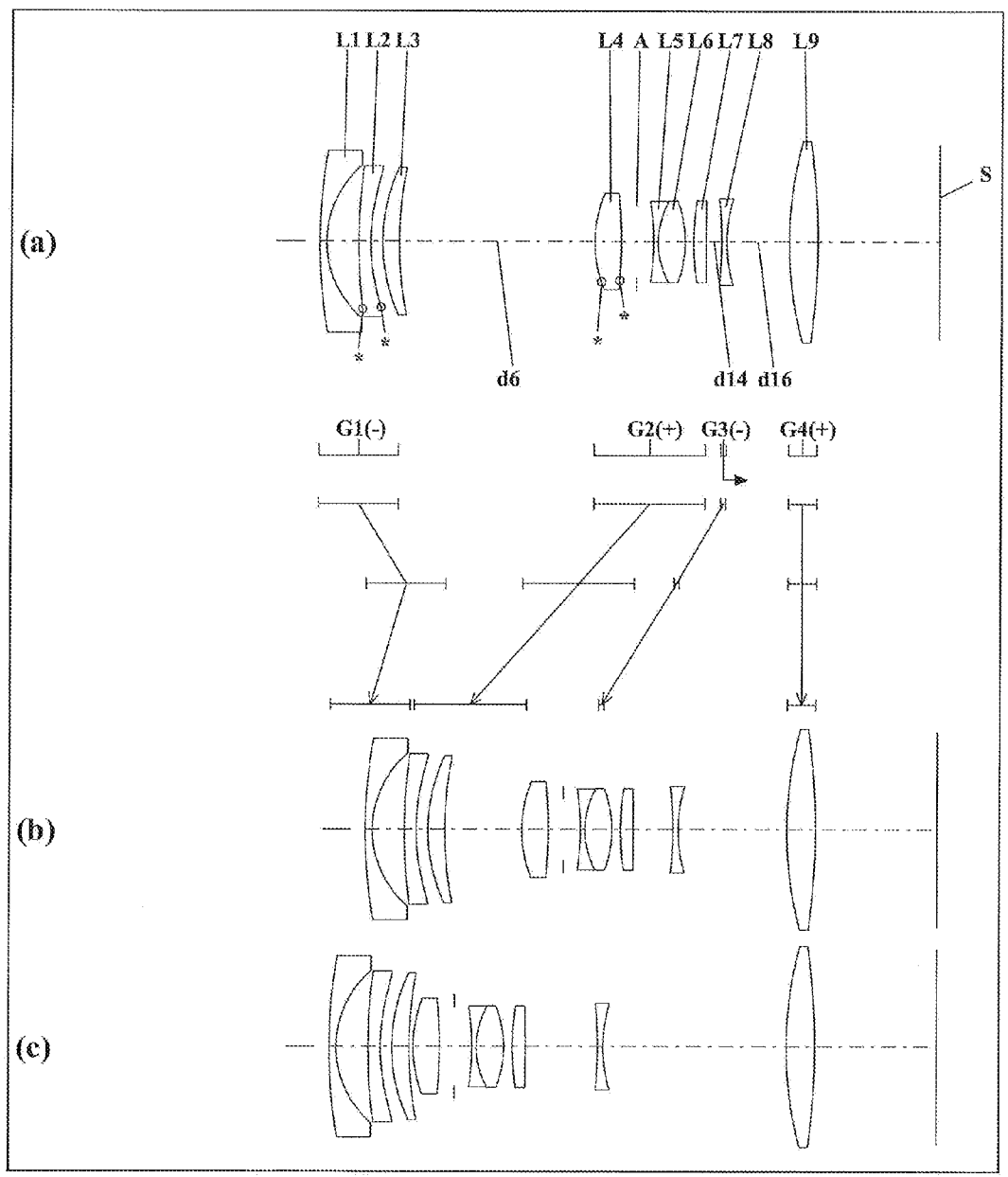
FIG. 10 is a lens arrangement diagram showing an infinity in-focus condition of a zoom lens system according to Embodiment 4 (Numerical Example 4)
Figure 11:
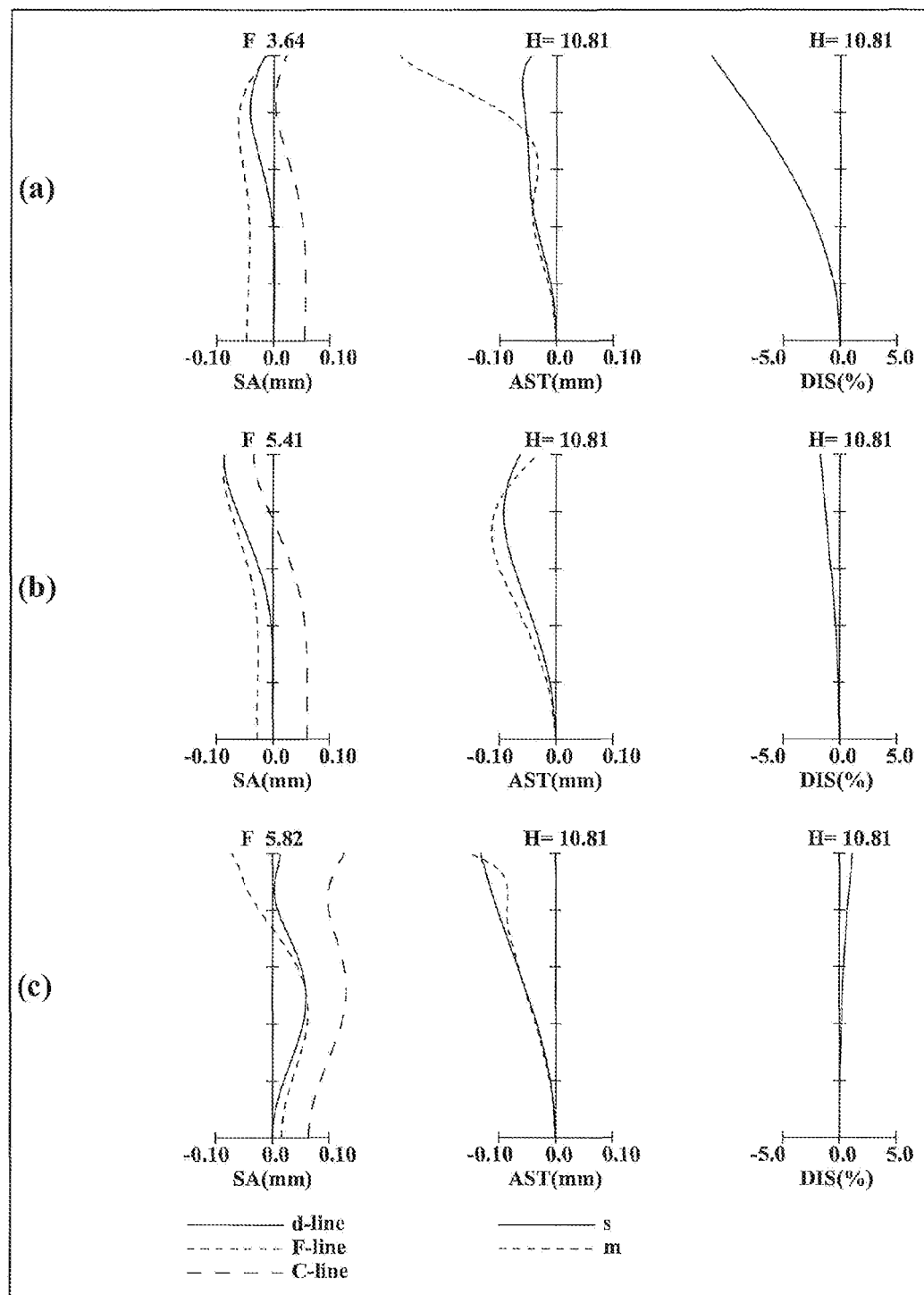
FIG. 11 is a longitudinal aberration diagram of an infinity in-focus condition of the zoom lens system according to Numerical Example 4.
Figure 12:
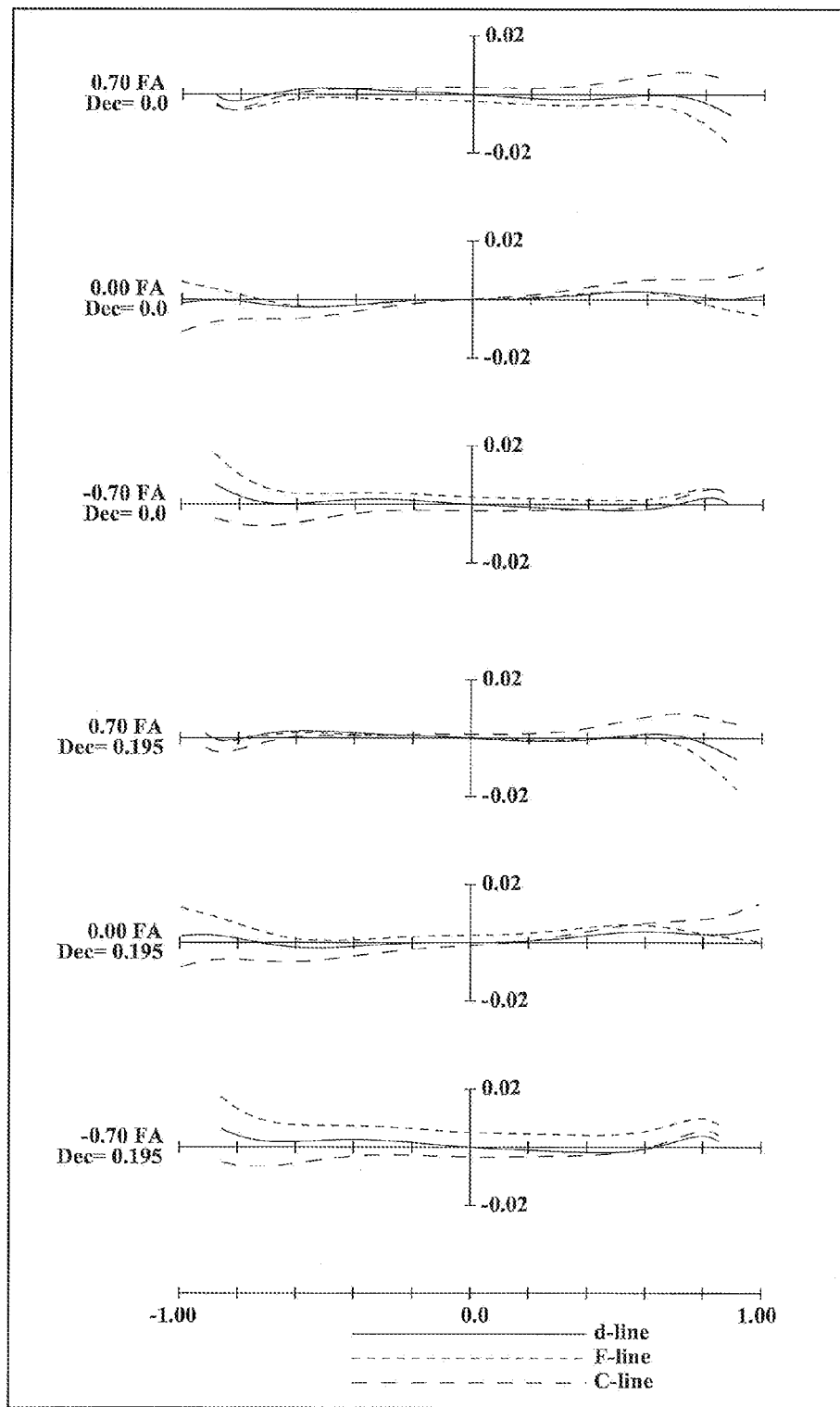
FIG. 12 is a lateral aberration diagram of the zoom lens system according to Numerical Example 4 at a telephoto limit in a basic state where image blur compensation is not performed and in an image blur compensation state.

As shown in FIG. 10, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. Among these, the second lens element L2 has two aspheric surfaces. The second lens element L2 is made of a material including, as a principal component, an olefin resin.

The second lens unit G2, in order from the object side to the image side, comprises: a bi-convex fourth lens element L4; a bi-concave fifth lens element L5; a bi-convex sixth lens element L6; and a bi-convex seventh lens element L7. Among these, the fifth lens element L5 and the sixth lens element L6 are cemented with each other. The fourth lens element L4 has two aspheric surfaces. An aperture diaphragm A is provided between the fourth lens element L4 and the fifth lens element L5. The aperture diaphragm A moves along the optical axis together with the second lens unit G2 in zooming from a wide-angle limit to a telephoto limit at the time of image taking.

Among the lens elements constituting the second lens unit G2, the seventh lens element L7 corresponds to an image blur compensating lens unit described later which moves in a direction perpendicular to the optical axis to optically compensate image blur.

The third lens unit G3 comprises solely a bi-concave eighth lens element L8. The eighth lens element L8 is made of a material including, as a principal component, a polycarbonate resin.

The fourth lens unit G4 comprises solely a bi-convex ninth lens element L9.

In zooming from the wide-angle limit to the telephoto limit at the time of image taking, the first lens unit G1 moves with locus of a convex to the image side, the second lens unit G2 and the third lens unit G3 monotonically move to the object side, and the fourth lens unit G4 is fixed with respect to the image surface S. That is, in zooming, the first lens unit G1, the second lens unit G2, and the third lens unit G3 individually move along the optical axis so that the interval between the first lens unit G1 and the second lens unit G2 decreases, the interval between the second lens unit G2 and the third lens unit G3 varies, and the interval between the third lens unit G3 and the fourth lens unit G4 increases.

In focusing from the infinity in-focus condition to the close-object in-focus condition, the third lens unit G3 moves to the image side along the optical axis in any zooming condition.

Embodiment 5

Figure 13:
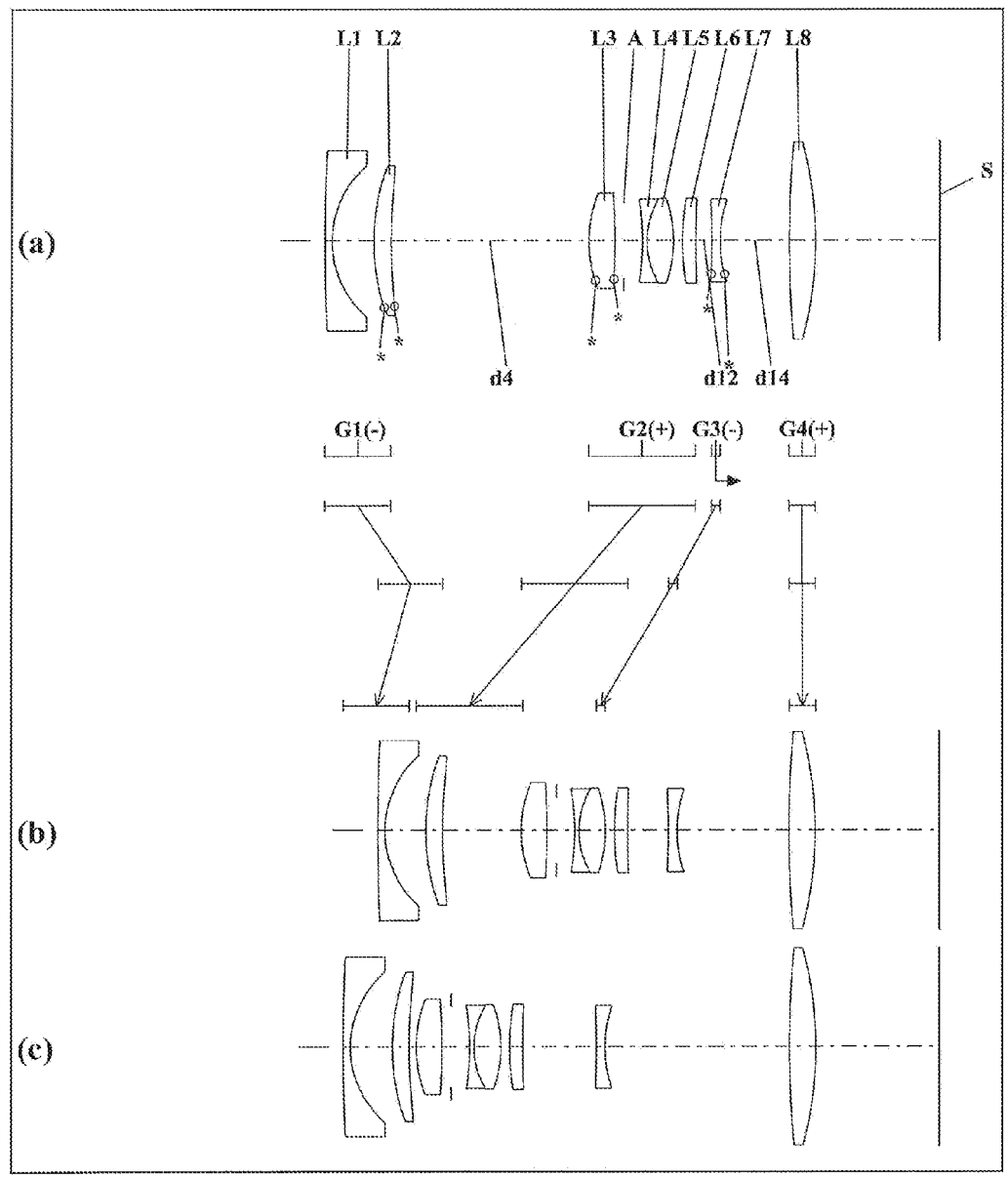
FIG. 13 is a lens arrangement diagram showing an infinity in-focus condition of a zoom lens system according to Embodiment 5 (Numerical Example 5)
Figure 14:
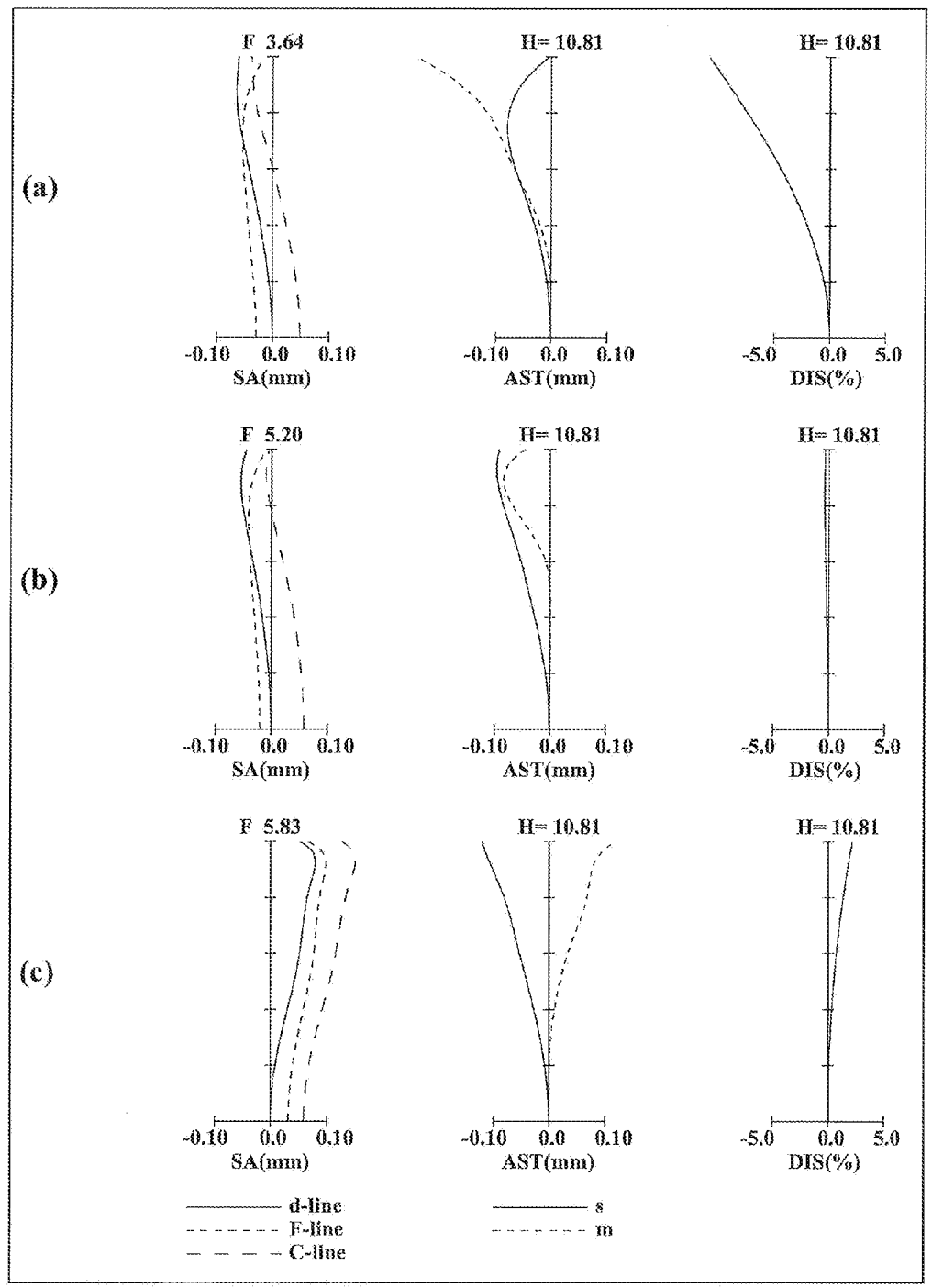
FIG. 14 is a longitudinal aberration diagram of an infinity in-focus condition of the zoom lens system according to Numerical Example 5.
Figure 15:
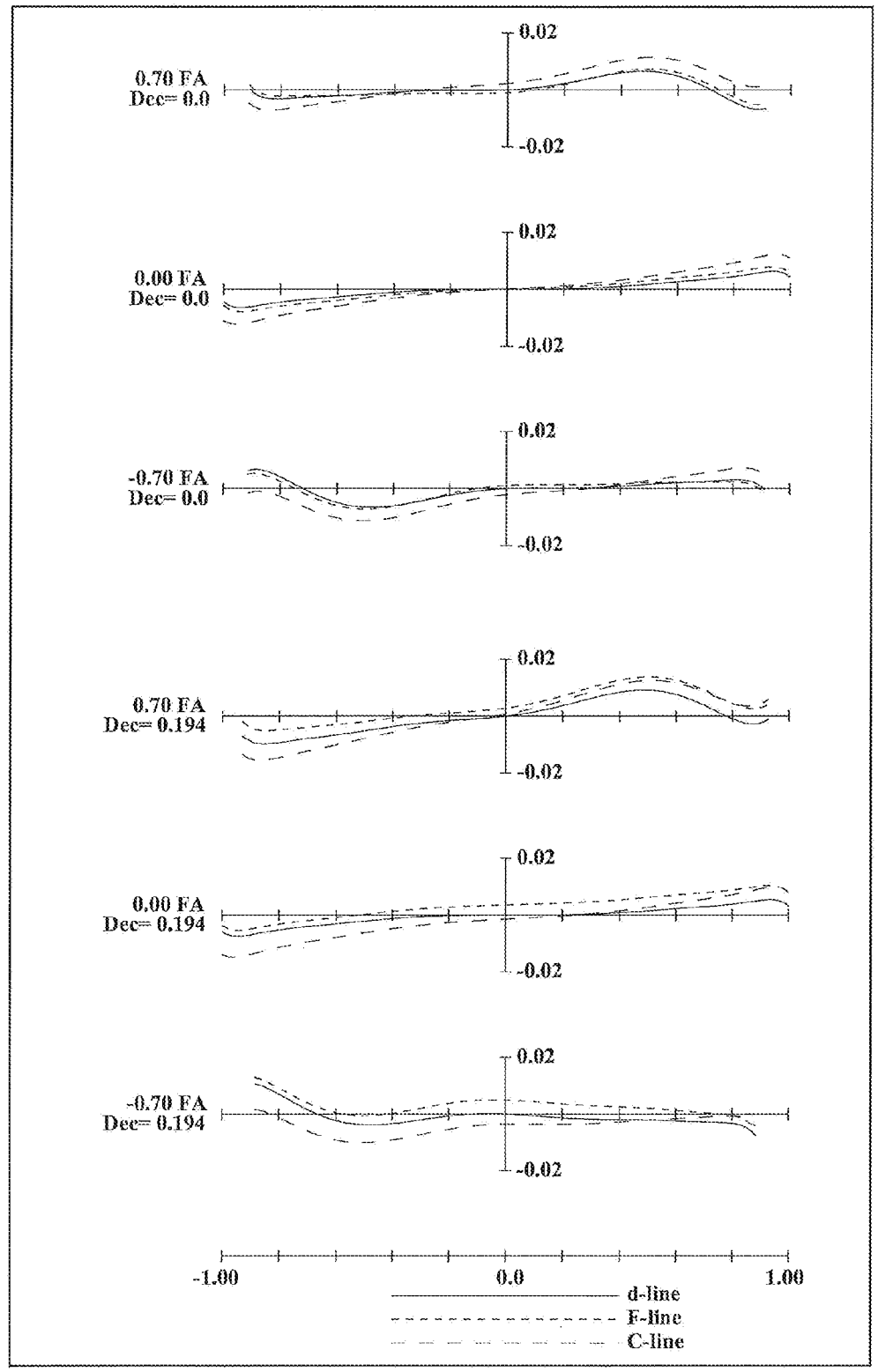
FIG. 15 is a lateral aberration diagram of the zoom lens system according to Numerical Example 5 at a telephoto limit in a basic state where image blur compensation is not performed and in an image blur compensation state.

As shown in FIG. 13, the first lens unit G1, in order from the object side to the image side, comprises: a negative meniscus first lens element L1 with the convex surface facing the object side; and a positive meniscus second lens element L2 with the convex surface facing the object side. Among these, the second lens element L2 has two aspheric surfaces. The second lens element L2 is made of a material including, as a principal component, a polycarbonate resin.

The second lens unit G2, in order from the object side to the image side, comprises: a bi-convex third lens element L3; a bi-concave fourth lens element L4; a bi-convex fifth lens element L5; and a positive meniscus sixth lens element L6 with the convex surface facing the object side. Among these, the fourth lens element L4 and the fifth lens element L5 are cemented with each other. The third lens element L3 has two aspheric surfaces. An aperture diaphragm A is provided between the third lens element L3 and the fourth lens element L4. The aperture diaphragm A moves along the optical axis together with the second lens unit G2 in zooming from a wide-angle limit to a telephoto limit at the time of image taking.

Among the lens elements constituting the second lens unit G2, the sixth lens element L6 corresponds to an image blur compensating lens unit described later which moves in a direction perpendicular to the optical axis to optically compensate image blur.

The third lens unit G3 comprises solely a bi-concave seventh lens element L7. The seventh lens element L7 has two aspheric surfaces. The seventh lens element L7 is made of a material including, as a principal component, a polycarbonate resin.

The fourth lens unit G4 comprises solely a bi-convex eighth lens element L8.

In zooming from the wide-angle limit to the telephoto limit at the time of image taking, the first lens unit G1 moves with locus of a convex to the image side, the second lens unit G2 and the third lens unit G3 monotonically move to the object side, and the fourth lens unit G4 is fixed with respect to the image surface S. That is, in zooming, the first lens unit G1, the second lens unit G2, and the third lens unit G3 individually move along the optical axis so that the interval between the first lens unit G1 and the second lens unit G2 decreases, the interval between the second lens unit G2 and the third lens unit G3 varies, and the interval between the third lens unit G3 and the fourth lens unit G4 increases.

In focusing from the infinity in-focus condition to the close-object in-focus condition, the third lens unit G3 moves to the image side along the optical axis in any zooming condition.

Embodiment 6

Figure 16:
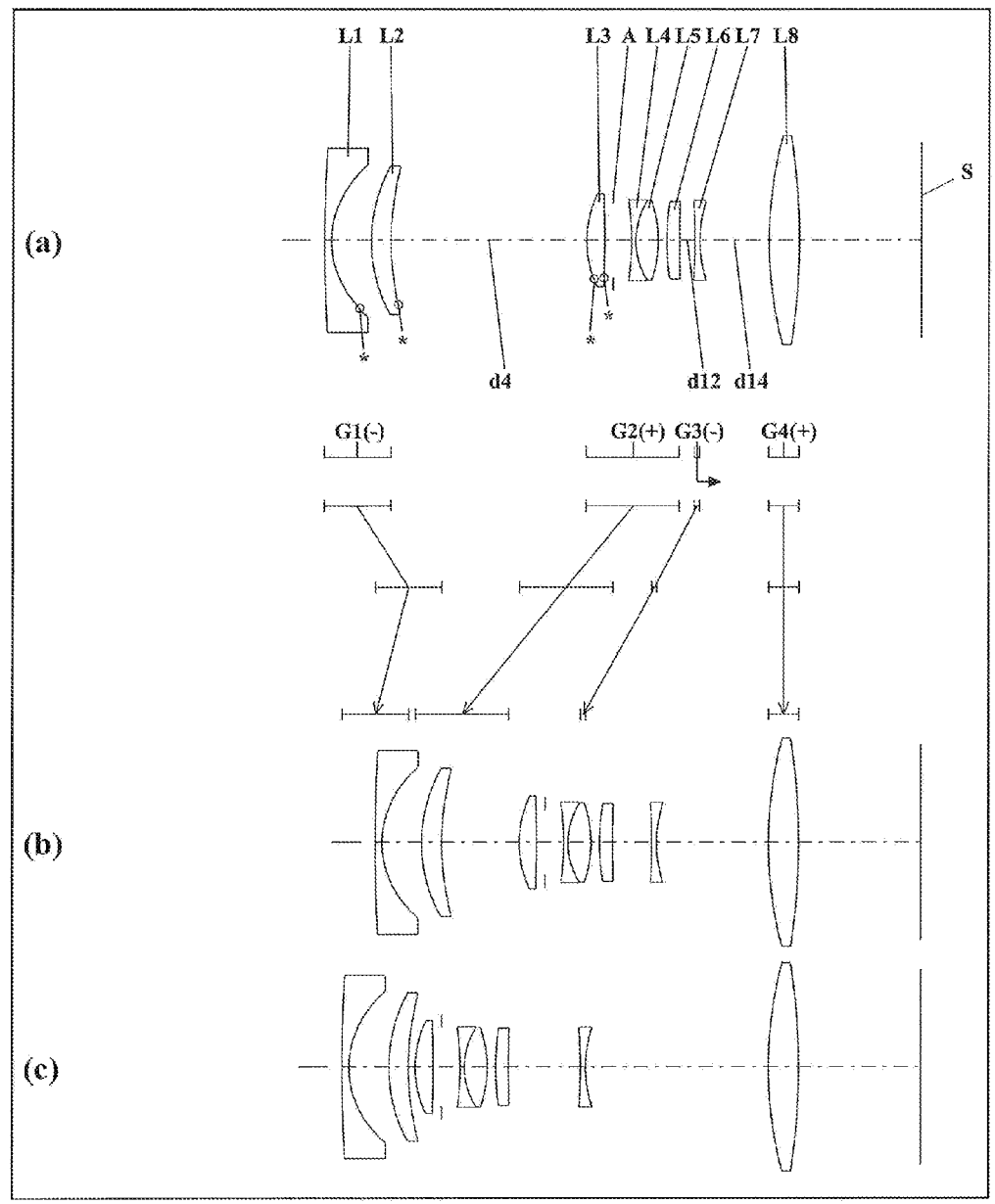
FIG. 16 is a lens arrangement diagram showing an infinity in-focus condition of a zoom lens system according to Embodiment 6 (Numerical Example 6)
Figure 17:
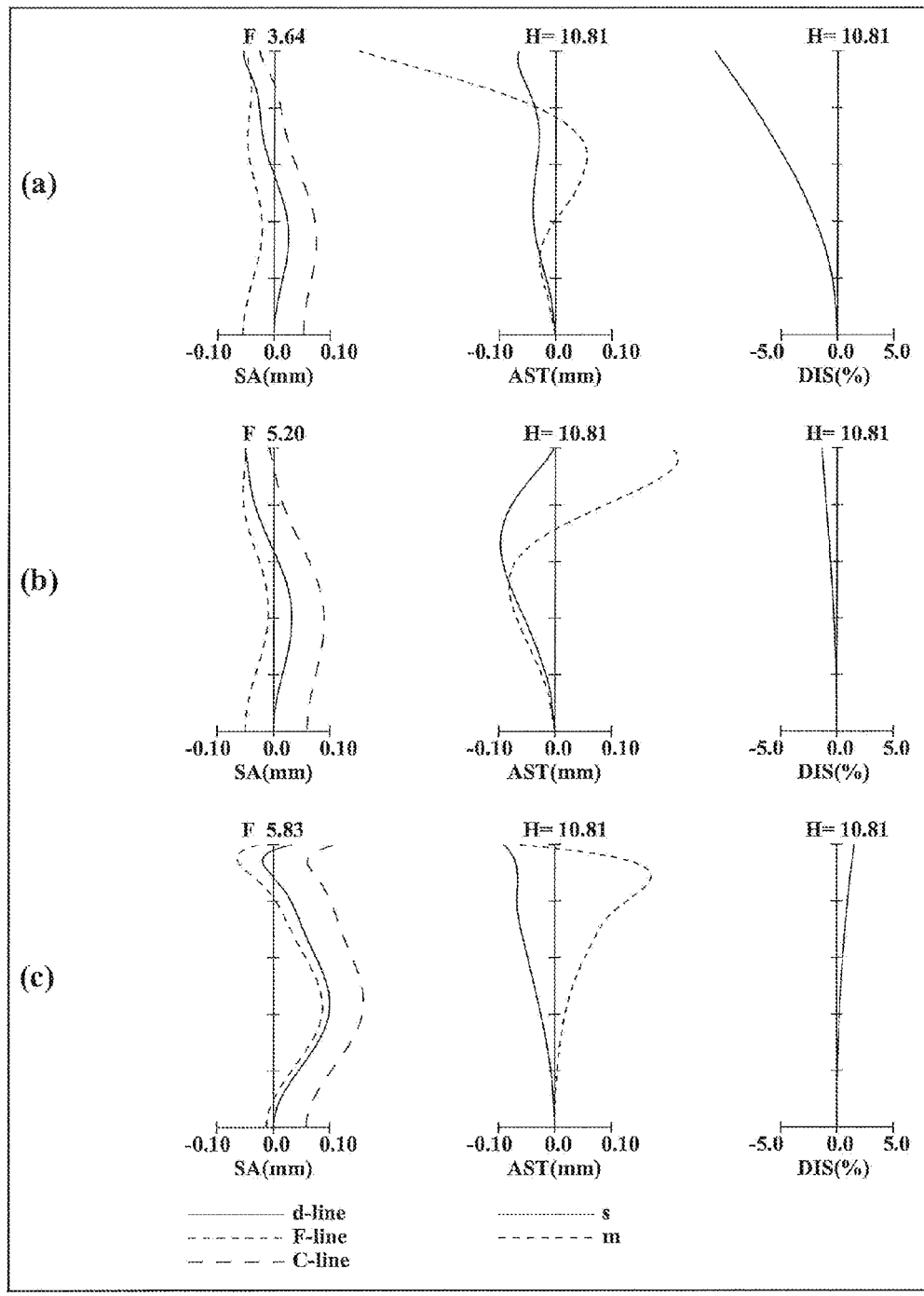
FIG. 17 is a longitudinal aberration diagram of an infinity in-focus condition of the zoom lens system according to Numerical Example 6.
Figure 18:
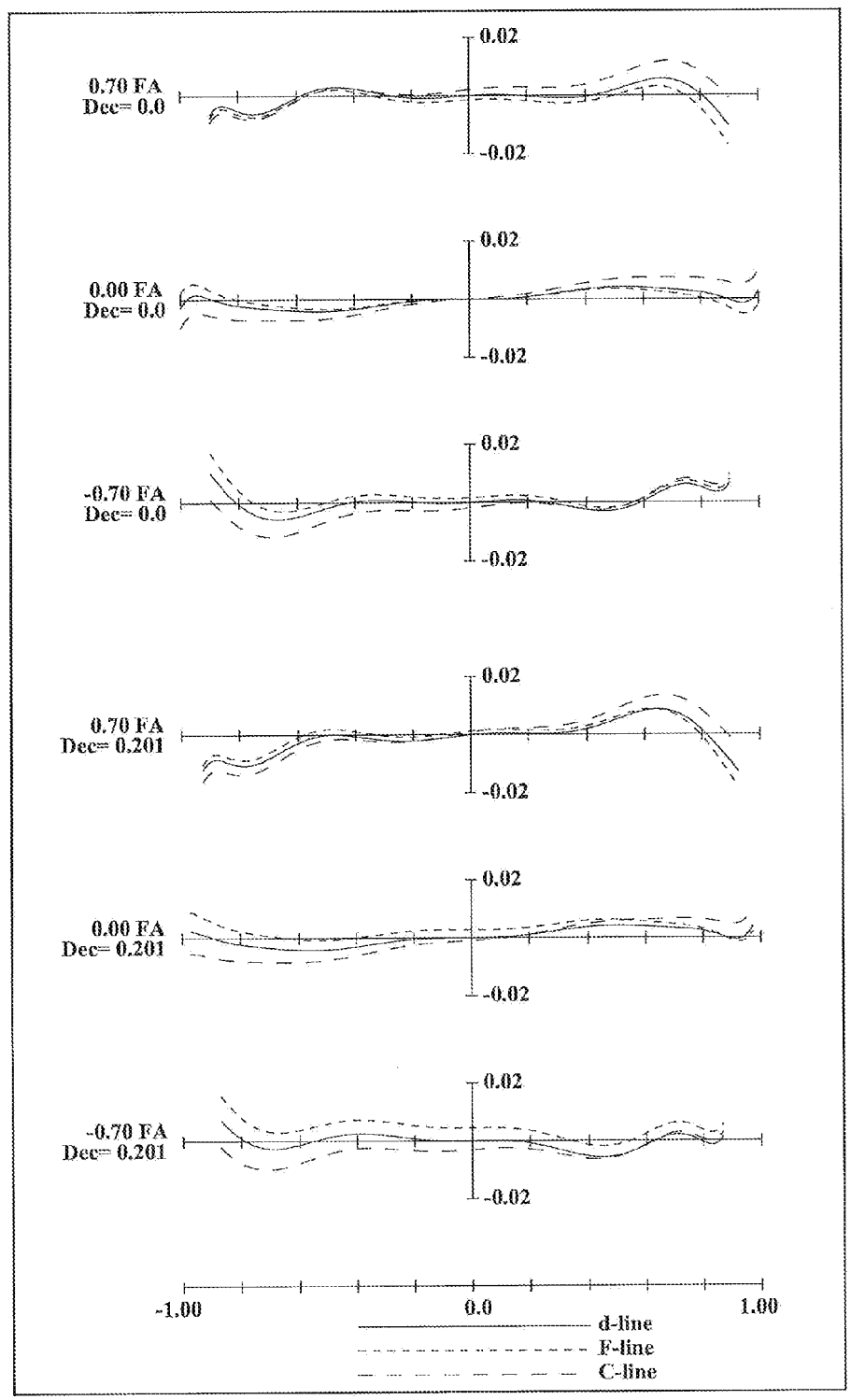
FIG. 18 is a lateral aberration diagram of the zoom lens system according to Numerical Example 6 at a telephoto limit in a basic state where image blur compensation is not performed and in an image blur compensation state.

As shown in FIG. 16, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 each have an aspheric image side surface. The second lens element L2 is made of a material including, as a principal component, a polycarbonate resin.

The second lens unit G2, in order from the object side to the image side, comprises: a bi-convex third lens element L3; a bi-concave fourth lens element L4; a bi-convex fifth lens element L5; and a positive meniscus sixth lens element L6 with the convex surface facing the object side. Among these, the fourth lens element L4 and the fifth lens element L5 are cemented with each other. The third lens element L3 has two aspheric surfaces. An aperture diaphragm A is provided between the third lens element L3 and the fourth lens element L4. The aperture diaphragm A moves along the optical axis together with the second lens unit G2 in zooming from a wide-angle limit to a telephoto limit at the time of image taking.

Among the lens elements constituting the second lens unit G2, the sixth lens element L6 corresponds to an image blur compensating lens unit described later which moves in a direction perpendicular to the optical axis to optically compensate image blur.

The third lens unit G3 comprises solely a bi-concave seventh lens element L7.

The fourth lens unit G4 comprises solely a bi-convex eighth lens element L8.

In zooming from the wide-angle limit to the telephoto limit at the time of image taking, the first lens unit G1 moves with locus of a convex to the image side, the second lens unit G2 and the third lens unit G3 monotonically move to the object side, and the fourth lens unit G4 is fixed with respect to the image surface S. That is, in zooming, the first lens unit G1, the second lens unit G2, and the third lens unit G3 individually move along the optical axis so that the interval between the first lens unit G1 and the second lens unit G2 decreases, the interval between the second lens unit G2 and the third lens unit G3 varies, and the interval between the third lens unit G3 and the fourth lens unit G4 increases.

In focusing from the infinity in-focus condition to the close-object in-focus condition, the third lens unit G3 moves to the image side along the optical axis in any zooming condition.

Each of the zoom lens systems according to Embodiments 1 to 6 includes the image blur compensating lens unit which moves in the direction perpendicular to the optical axis in order to optically compensate image blur. The image blur compensating lens unit compensates image point movement caused by vibration of the entire system, that is, optically compensates image blur caused by hand blurring, vibration and the like.

The image blur compensating lens unit moves in the direction perpendicular to the optical axis when compensating image point movement caused by vibration of the entire system. Thus, compensation of image blur can be performed in the state that size increase in the entire zoom lens system is suppressed to realize a compact construction and that excellent imaging characteristics such as small decentering coma aberration and small decentering astigmatism are maintained.

The image blur compensating lens unit according to the present disclosure may be a single lens unit. When a single lens unit is composed of a plurality of lens elements, the image blur compensating lens unit may be any one lens element or a plurality of adjacent lens elements among the plurality of lens elements. That is, while one lens element among the lens elements constituting the second lens unit G2 serves as an image blur compensating lens unit in the zoom lens systems according to Embodiments 1 to 6, the entirety of the second lens unit G2 may serve as an image blur compensating lens unit.

In the zoom lens systems according to Embodiments 1 and 4 to 6, one lens element among the lens elements constituting the first lens unit G1 is made of a resin material. In the zoom lens systems according to Embodiments 4 and 5, the lens element constituting the third lens unit G3 is made of a resin material. In this way, when at least one lens element among the lens elements constituting the first lens unit G1 and the lens element constituting the third lens unit G3 is made of a resin material, further reductions in weight and cost of the zoom lens system can be achieved.

In the zoom lens systems according to Embodiments 1 to 6, the aperture diaphragm A is placed in the second lens unit G2, and the aperture diaphragm A moves along the optical axis together with the second lens unit G2 in zooming from the wide-angle limit to the telephoto limit at the time of image taking. Therefore, in the zoom lens systems according to Embodiments 1 to 6, the interval between the first lens unit G1 and the second lens unit G2 can be reduced as compared with, for example, a zoom lens system in which an aperture diaphragm A is placed on the object side of the second lens unit G2, and thus further size reduction of the zoom lens system can be achieved.

As described above, Embodiments 1 to 6 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 6 can satisfy. Here, a plurality of beneficial conditions is set forth for the zoom lens system according to each embodiment. A construction that satisfies all the plurality of conditions is most effective for the zoom lens system. However, when an individual condition is satisfied, a zoom lens system having the corresponding effect is obtained.

For example, in a zoom lens system like the zoom lens systems according to Embodiments 1 to 6, which comprises, in order from the object side to the image side, a first lens unit having negative optical power, a second lens unit having positive optical power, a third lens unit having negative optical power, and a fourth lens unit having positive optical power, and in which the first lens unit, the second lens unit, and the third lens unit move along the optical axis in zooming from a wide-angle limit to a telephoto limit at the time of image taking, and the third lens unit moves along the optical axis in focusing from an infinity in-focus condition to a close-object in-focus condition (this lens configuration is referred to as a basic configuration I of the embodiments, hereinafter), the following conditions (1) and (2) are satisfied:

$$2.5 \leq |(1-(\beta_{3T})^2) \times (\beta_{4T})^2| \leq 7.0 \qquad (1)$$

$$0.5 \leq Bf_W/f_W \leq 4.0 \qquad (2)$$

where $\beta_{3T}$ is a lateral magnification of the third lens unit at an infinite object point distance, at the telephoto limit, $\beta_{4T}$ is a lateral magnification of the fourth lens unit at an infinite object point distance, at the telephoto limit, $Bf_W$ is a back focal length of the zoom lens system at the wide-angle limit, and $f_W$ is a focal length of the zoom lens system at the wide-angle limit.

Further, in a zoom lens system like the zoom lens systems according to Embodiments 1 to 6, which comprises, in order from the object side to the image side, a first lens unit having negative optical power, a second lens unit having positive optical power, a third lens unit having negative optical power, and a fourth lens unit having positive optical power, and in which the third lens unit is composed of one lens element, the first lens unit, the second lens unit, and the third lens unit move along the optical axis in zooming from a wide-angle limit to a telephoto limit at the time of image taking, and the third lens unit moves from the object side to the image side along the optical axis in focusing from an infinity in-focus condition to a close-object in-focus condition (this lens configuration is referred to as a basic configuration II of the embodiments, hereinafter), the following conditions (2), (3), and (4) are satisfied:

$$0.5 \leq Bf_W/f_W \leq 4.0 \qquad (2)$$

$$vd_3 \leq 40.0 \qquad (3)$$

$$0.3 \leq |M_3/f_W| \leq 1.3 \qquad (4)$$

where $Bf_W$ is a back focal length of the zoom lens system at the wide-angle limit, $vd_3$ is an Abbe number to the d-line of the lens element constituting the third lens unit, $M_3$ is an amount of movement of the third lens unit in zooming from the wide-angle limit to the telephoto limit at the time of image taking, and $f_W$ is the focal length of the zoom lens system at the wide-angle limit.

The condition (1) sets forth focus sensitivity of the third lens unit. When the value goes below the lower limit of the condition (1), the amount of movement of the third lens unit becomes excessively large in focusing, which makes it difficult to appropriately compensate aberrations such as chromatic aberration and curvature of field over the entire range from infinity to close object. In addition, the excessively large amount of movement of the third lens unit in focusing makes the overall length of the lens system excessively long, which makes it difficult to provide compact lens barrels, interchangeable lens apparatuses, and camera systems. When the value exceeds the upper limit of the condition (1), the optical power of the third lens unit becomes excessively strong, and fluctuations in the image surface are increased in focusing, which makes it difficult to compensate aberrations over the entire range from the infinity to the close object. In addition, since the negative optical power of the third lens unit becomes excessively strong, the lens diameter of the fourth lens unit is increased, which makes it difficult to provide compact lens barrels, interchangeable lens apparatuses, and camera systems.

When at least one of the following conditions (1)' and (1)" is satisfied, the above-mentioned effect is achieved more successfully.

$$3.0 \leq |(1-(\beta_{3T})^2) \times (\beta_{4T})^2| \qquad (1)'$$

$$|(1-(\beta_{3T})^2) \times (\beta_{4T})^2| \leq 4.0 \qquad (1)''$$

The condition (2) sets forth the back focal length of the lens system. When the value goes below the lower limit of the condition (2), a sufficient back focal length cannot be secured, and the conditions for mounting the lens system on an interchangeable-lens type camera system cannot be satisfied. When the value exceeds the upper limit of the condition (2), the back focal length becomes excessively long, which makes it difficult to appropriately compensate aberrations.

When at least one of the following conditions (2)' and (2)" is satisfied, the above-mentioned effect is achieved more successfully.

$$0.7 \leq Bf_W/f_W \qquad (2)'$$

$$Bf_W/f_W \leq 1.3 \qquad (2)''$$

The condition (3) sets forth the Abbe number of the lens element constituting the third lens unit. When the condition (3) is not satisfied, it is difficult to appropriately compensate aberrations over the entire range from the infinity to the close object.

When the following condition (3)' is satisfied, the above-mentioned effect is achieved more successfully.

$$vd_3 \leq 32.0 \qquad (3)'$$

The condition (4) sets forth the ratio between the amount of movement of the third lens unit in zooming and the focal length of the zoom lens system at the wide-angle limit. When the value goes below the lower limit of the condition (4), the optical power of the third lens unit becomes excessively strong, and fluctuations in the image surface are increased in zooming, which makes it difficult to appropriately compensate aberrations over the entire range from the wide-angle limit to the telephoto limit. In addition, since the negative optical power of the third lens unit becomes excessively strong, the lens diameter of the fourth lens unit is increased, which makes it difficult to provide compact lens barrels, interchangeable lens apparatuses, and camera systems. When the value exceeds the upper limit of the condition (4), the amount of movement of the third lens unit in zooming becomes excessively large, which makes it difficult to appropriately compensate aberrations such as chromatic aberration and curvature of field over the entire range from the wide-angle limit to the telephoto limit. In addition, the excessively large amount of movement of the third lens unit in zooming makes the overall length of the lens system excessively long, which makes it difficult to provide compact lens barrels, interchangeable lens apparatuses, and camera systems.

When at least one of the following conditions (4)' and (4)"
is satisfied, the above-mentioned effect is achieved more
successfully.

$$0.5 \leq |M_3/f_W| \quad (4)'$$

$$|M_3/f_W| \leq 1.0 \quad (4)''$$

A zoom lens system having the basic configuration I and
a zoom lens system having the basic configuration II, like
the zoom lens systems according to Embodiments 1 to 6,
beneficially satisfy the following condition (5).

$$0.7 < f_2/f_W < 1.4 \quad (5)$$

where $f_2$ is a focal length of the second lens unit, and $f_W$ is the focal length of the zoom lens system at the wide-angle limit.

The condition (5) sets forth the ratio between the focal length of the second lens unit and the focal length of the zoom lens system at the wide-angle limit. When the value goes below the lower limit of the condition (5), the optical power of the second lens unit becomes excessively strong, which makes it difficult to appropriately compensate aberrations over the entire range from the wide-angle limit to the telephoto limit. When the value exceeds the upper limit of the condition (5), the overall length of the lens system at the telephoto limit becomes excessively long, which makes it difficult to provide compact lens barrels, interchangeable lens apparatuses, and camera systems.

When at least one of the following conditions (5)' and (5)"
is satisfied, the above-mentioned effect is achieved more
successfully.

$$1.0 < f_2/f_W \quad (5)'$$

$$f_2/f_W < 1.1 \quad (5)''$$

The individual lens units constituting the zoom lens systems according to Embodiments 1 to 6 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

Embodiment 7

Figure 19:
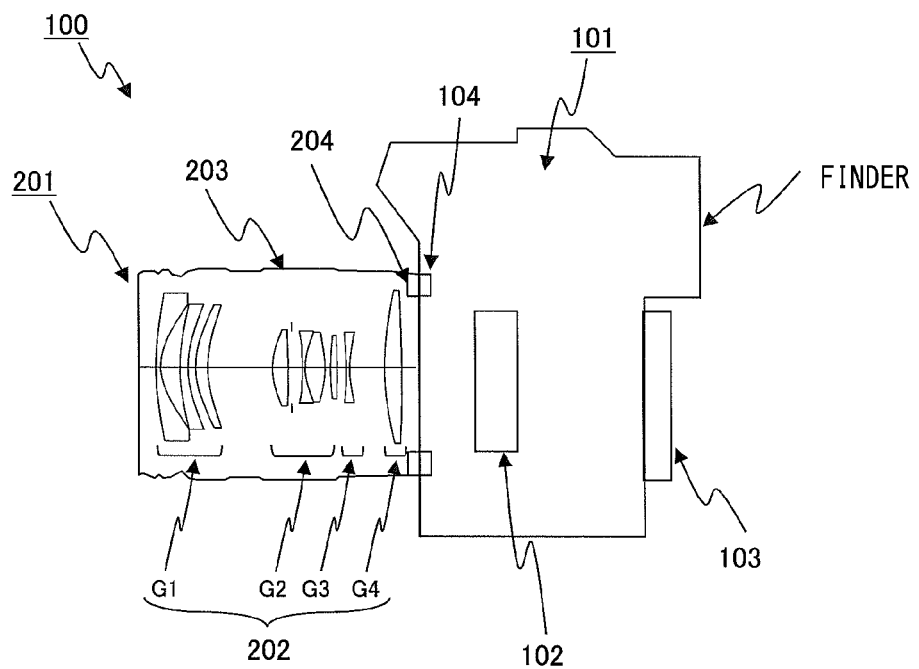
FIG. 19 is a schematic construction diagram of an interchangeable-lens type digital camera system according to Embodiment 7.

FIG. 19 is a schematic construction diagram of an interchangeable-lens type digital camera system according to Embodiment 7.

The interchangeable-lens type digital camera system 100 according to Embodiment 7 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 6; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 19, the zoom lens system according to Embodiment 1 is employed as the zoom lens system 202.

In Embodiment 7, since the zoom lens system 202 according to any of Embodiments 1 to 6 is employed, a compact interchangeable lens apparatus having excellent imaging performance can be realized at low cost. Moreover, size reduction and cost reduction of the entire camera system 100 according to Embodiment 7 can be achieved. In the zoom lens systems according to Embodiments 1 to 6, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 6.

As described above, Embodiment 7 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 6 are implemented. Here, in the numerical examples, the units of length are all "mm", while the units of view angle are all "°". Moreover, in the numerical examples, r is the radius of curvature, d is the axial distance, nd is the refractive index to the d-line, and νd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 5, 8, 11, 14 and 17 are longitudinal aberration diagrams of an infinity in-focus condition of the zoom lens systems according to Numerical Examples 1 to 6, respectively.

In each longitudinal aberration diagram, part (a) shows the aberration at a wide-angle limit, part (b) shows the aberration at a middle position, and part (c) shows the aberration at a telephoto limit Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15 and 18 are lateral aberration diagrams of the zoom lens systems at a telephoto limit according to Numerical Examples 1 to 6, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (Numerical Examples 1 to 4: the seventh lens element L7, Numerical Examples 5 and 6: the sixth lens element L6) is moved by a predetermined amount in a direction perpendicular to the optical axis at a telephoto limit Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line, and the long dash line indicate the characteristics to the d-line, the F-line, and the C-line, respectively. In each lateral aberration diagram, the meridional plane is adopted as the plane containing the optical axis of the first lens unit G1 and the optical axis of the second lens unit G2.

Here, in the zoom lens system according to each example, the amount of movement of the image blur compensating lens unit in a direction perpendicular to the optical axis in an image blur compensation state at a telephoto limit is as follows.

| Numerical Example | Amount of movement (mm) |
|---|---|
| 1 | 0.233 |
| 2 | 0.176 |
| 3 | 0.139 |
| 4 | 0.195 |
| 5 | 0.194 |
| 6 | 0.201 |

Here, when the shooting distance is infinity, at a telephoto limit, the amount of image decentering in a case that the zoom lens system inclines by 0.3° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data.

TABLE 1

(Surface data)

| Surface number | r | d | nd | vd |
|---|---|---|---|---|
| Object surface | ∞ | | | |
| 1 | 55.88440 | 0.80000 | 1.80610 | 40.7 |
| 2 | 11.50390 | 3.49470 | | |
| 3* | 59.73700 | 1.40000 | 1.54360 | 56.0 |
| 4* | 21.66760 | 1.32230 | | |
| 5 | 17.84280 | 1.98780 | 1.84666 | 23.8 |
| 6 | 35.52740 | Variable | | |
| 7* | 12.58730 | 2.62770 | 1.80755 | 40.9 |
| 8* | −88.80260 | 1.00000 | | |
| 9(Diaphragm) | ∞ | 1.94580 | | |
| 10 | −38.09640 | 0.50000 | 1.80610 | 33.3 |
| 11 | 8.05840 | 3.27990 | 1.48749 | 70.4 |
| 12 | −14.21050 | 1.00000 | | |
| 13 | 32.47050 | 1.50000 | 1.69680 | 55.5 |
| 14 | 997.64650 | Variable | | |
| 15 | −55.93500 | 0.60000 | 1.71736 | 29.5 |
| 16 | 16.83760 | Variable | | |
| 17 | 41.56450 | 3.40770 | 1.90366 | 31.3 |
| 18 | −103.13710 | (BF) | | |
| Image surface | ∞ | | | |

TABLE 2

(Aspherical data)

Surface No. 3

K = −8.34008E+00, A4 = 2.26245E−05, A6 = 1.19134E−06,
A8 = −1.88171E−08 A10 = 9.45737E−11
Surface No. 4

K = −5.69352E−01, A4 = −2.82932E−06, A6 = 1.16528E−06,
A8 = −2.32669E−08 A10 = 1.06535E−10

TABLE 2-continued (Aspherical data)

Surface No. 7

K = −1.40890E−01, A4 = −2.44783E−05, A6 = 9.07159E−07,
A8 = −3.76032E−08 A10 = 0.00000E+00
Surface No. 8

K = 3.00000E+00, A4 = 2.48392E−05, A6 = 6.51602E−07,
A8 = −3.95367E−08 A10 = 0.00000E+00

TABLE 3

(Various data)

Zooming ratio 2.79737

|  | Wide-angle limit | Middle position | Telephoto limit |
|---|---|---|---|
| Focal length | 14.4887 | 24.2326 | 40.5303 |
| F-number | 3.64026 | 5.40784 | 5.82491 |
| Half view angle | 39.8216 | 24.4365 | 14.7867 |
| Image height | 10.8150 | 10.8150 | 10.8150 |
| Overall length of lens system | 70.5601 | 64.4155 | 68.2045 |
| BF | 14.20554 | 14.19451 | 14.20351 |
| d6 | 22.6936 | 8.7980 | 0.5000 |
| d14 | 1.7859 | 4.6296 | 8.4459 |
| d16 | 7.0092 | 11.9275 | 20.1892 |
| Entrance pupil position | 13.1926 | 10.1647 | 7.1674 |
| Exit pupil position | −25.1694 | −51.0228 | −256.0419 |
| Front principal points position | 22.3500 | 25.3932 | 41.6191 |
| Back principal points position | 56.0714 | 40.1829 | 27.6742 |

Single lens data

| Lens element | Initial surface number | Focal length |
|---|---|---|
| 1 | 1 | −18.1159 |
| 2 | 3 | −63.3665 |
| 3 | 5 | 40.2621 |
| 4 | 7 | 13.8119 |
| 5 | 10 | −8.2117 |
| 6 | 11 | 11.0836 |
| 7 | 13 | 48.1363 |
| 8 | 15 | −17.9790 |
| 9 | 17 | 33.1545 |

Zoom lens unit data

| Lens unit | Initial surface No. | Focal length | Overall length of lens unit | Front principal points position | Back principal points position |
|---|---|---|---|---|---|
| 1 | 1 | −22.63970 | 9.00480 | −0.28481 | 1.32113 |
| 2 | 7 | 15.75933 | 11.85340 | 2.63344 | 3.98944 |
| 3 | 15 | −17.97901 | 0.60000 | 0.26762 | 0.51944 |
| 4 | 17 | 33.15448 | 3.40770 | 0.52000 | 2.11738 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.39506 | −0.60623 | −0.89048 |
| 3 | 15 | 3.04147 | 3.31287 | 3.77415 |
| 4 | 17 | 0.53262 | 0.53295 | 0.53268 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows the various data.

TABLE 4

(Surface data)

| Surface number | r | d | nd | vd |
|---|---|---|---|---|
| Object surface | ∞ |  |  |  |
| 1 | 24.48920 | 0.80000 | 1.80610 | 33.3 |
| 2 | 11.32080 | 4.70090 |  |  |
| 3 | −62.61010 | 0.70000 | 1.51680 | 64.2 |
| 4 | 19.29390 | 1.09310 |  |  |
| 5 | 16.48600 | 2.03050 | 1.84666 | 23.8 |
| 6 | 32.53870 | Variable |  |  |
| 7* | 13.48260 | 1.98100 | 1.80755 | 40.9 |
| 8* | −106.72950 | 1.02250 |  |  |
| 9(Diaphragm) | ∞ | 2.18910 |  |  |
| 10 | −24.07850 | 0.50000 | 1.80610 | 33.3 |
| 11 | 8.73130 | 2.85390 | 1.56384 | 60.8 |
| 12 | −14.31230 | 1.00000 |  |  |
| 13 | 33.26640 | 1.50000 | 1.71295 | 55.3 |
| 14 | −138.98580 | Variable |  |  |
| 15 | −92.67710 | 0.60000 | 1.61680 | 39.5 |
| 16 | 14.06400 | Variable |  |  |
| 17 | 59.13450 | 3.57200 | 1.76411 | 46.5 |
| 18 | −49.66410 | (BF) |  |  |
| Image surface | ∞ |  |  |  |

TABLE 5

(Aspherical data)

Surface No. 7

K = 0.00000E+00, A4 = −3.05232E−05, A6 = 6.20133E−06,
A8 = −2.88868E−07 A10 = 6.04480E−09
Surface No. 8

K = 0.00000E+00, A4 = 1.49733E−05, A6 = 6.70981E−06,
A8 = −3.36836E−07 A10 = 7.25149E−09

TABLE 6

(Various data)

Zooming ratio 2.79756

|  | Wide-angle limit | Middle position | Telephoto limit |
|---|---|---|---|
| Focal length | 14.4902 | 24.2365 | 40.5374 |
| F-number | 3.64036 | 5.20117 | 5.82518 |
| Half view angle | 39.9416 | 24.2653 | 14.7516 |
| Image height | 10.8150 | 10.8150 | 10.8150 |
| Overall length of lens system | 70.5591 | 65.4977 | 70.5675 |
| BF | 14.20448 | 14.19606 | 14.21235 |
| d6 | 21.2532 | 8.4036 | 0.8724 |
| d14 | 1.7859 | 4.6091 | 8.2329 |
| d16 | 8.7725 | 13.7459 | 22.7068 |
| Entrance pupil position | 14.0290 | 11.0248 | 8.0968 |
| Exit pupil position | −31.5326 | −62.3199 | −387.7867 |
| Front principal points position | 23.9285 | 27.5844 | 44.5464 |
| Back principal points position | 56.0688 | 41.2611 | 30.0301 |

TABLE 6-continued (Various data)

Single lens data

| Lens element | Initial surface number | Focal length |
|---|---|---|
| 1 | 1 | −26.8453 |
| 2 | 3 | −28.4561 |
| 3 | 5 | 37.3056 |
| 4 | 7 | 14.9331 |
| 5 | 10 | −7.8954 |
| 6 | 11 | 10.0675 |
| 7 | 13 | 37.7858 |
| 8 | 15 | −19.7549 |
| 9 | 17 | 35.8363 |

Zoom lens unit data

| Lens unit | Initial surface No. | Focal length | Overall length of lens unit | Front principal points position | Back principal points position |
|---|---|---|---|---|---|
| 1 | 1 | −21.38955 | 9.32450 | 1.58831 | 3.27868 |
| 2 | 7 | 15.26216 | 11.04650 | 3.39628 | 4.34130 |
| 3 | 15 | −19.75487 | 0.60000 | 0.32152 | 0.55121 |
| 4 | 17 | 35.83628 | 3.57200 | 1.11641 | 2.63438 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.41448 | −0.63664 | −0.92825 |
| 3 | 15 | 2.83040 | 3.08088 | 3.53696 |
| 4 | 17 | 0.57746 | 0.57770 | 0.57724 |

Numerical Example 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows the various data.

TABLE 7

(Surface data)

| Surface number | r | d | nd | vd |
|---|---|---|---|---|
| Object surface | ∞ | | | |
| 1 | 187.31540 | 0.80000 | 1.80450 | 39.6 |
| 2 | 11.90660 | 3.29940 | | |
| 3 | −330.82390 | 0.60000 | 1.51633 | 64.1 |
| 4* | 30.51510 | 1.00000 | | |
| 5 | 23.31890 | 2.01040 | 1.84666 | 23.8 |
| 6 | 106.62220 | Variable | | |
| 7* | 11.88240 | 2.25860 | 1.80998 | 40.9 |
| 8* | −99.76900 | 1.02250 | | |
| 9(Diaphragm) | ∞ | 2.12830 | | |
| 10 | −26.28120 | 0.50000 | 1.80610 | 33.3 |
| 11 | 7.90000 | 2.77480 | 1.48749 | 70.4 |
| 12 | −16.17170 | 1.00000 | | |
| 13 | 24.43370 | 1.50000 | 1.61800 | 63.4 |
| 14 | −75.85740 | Variable | | |
| 15 | −251.30820 | 0.50000 | 1.68893 | 31.1 |
| 16* | 14.46880 | Variable | | |
| 17 | 127.55220 | 3.12070 | 1.76182 | 26.6 |
| 18 | −38.13350 | (BF) | | |
| Image surface | ∞ | | | |

TABLE 8

(Aspherical data)

Surface No. 4

K = 0.00000E+00, A4 = −4.09917E−05, A6 = −1.37384E−08, A8 = −2.72166E−09 A10 = 2.63537E−12

Surface No. 7

K = 0.00000E+00, A4 = −9.44317E−06, A6 = 5.32721E−07, A8 = −2.84708E−08 A10 = 5.94800E−10

Surface No. 8

K = 0.00000E+00, A4 = 3.89006E−05, A6 = 3.65226E−07, A8 = −3.27918E−08 A10 = 7.05471E−10

Surface No. 16

K = 0.00000E+00, A4 = 3.94023E−05, A6 = −9.77024E−07, A8 = 3.15441E−08 A10 = −8.42007E−10

TABLE 9

(Various data)

Zooming ratio 2.79749

| | Wide-angle limit | Middle position | Telephoto limit |
|---|---|---|---|
| Focal length | 14.4893 | 24.2340 | 40.5336 |
| F-number | 3.64015 | 5.20101 | 5.82495 |
| Half view angle | 39.9399 | 24.1939 | 14.6533 |
| Image height | 10.8150 | 10.8150 | 10.8150 |
| Overall length of lens system | 67.0599 | 63.5599 | 67.0119 |
| BF | 14.20156 | 14.20116 | 14.20327 |
| d6 | 20.7097 | 8.6891 | 0.8200 |
| d14 | 1.7859 | 4.3340 | 8.4459 |
| d16 | 7.8480 | 13.8209 | 21.0280 |
| Entrance pupil position | 11.5555 | 9.0472 | 6.3639 |
| Exit pupil position | −27.0616 | −55.7751 | −164.7101 |
| Front principal points position | 20.9570 | 24.8885 | 37.7144 |
| Back principal points position | 52.5706 | 39.3258 | 26.4783 |

Single lens data

| Lens element | Initial surface number | Focal length |
|---|---|---|
| 1 | 1 | −15.8367 |
| 2 | 3 | −54.0784 |
| 3 | 5 | 34.8661 |
| 4 | 7 | 13.2285 |
| 5 | 10 | −7.4863 |
| 6 | 11 | 11.3145 |
| 7 | 13 | 30.0764 |
| 8 | 15 | −19.8433 |
| 9 | 17 | 38.8517 |

Zoom lens unit data

| Lens unit | Initial surface No. | Focal length | Overall length of lens unit | Front principal points position | Back principal points position |
|---|---|---|---|---|---|
| 1 | 1 | −20.48528 | 7.70980 | −0.74254 | 0.34672 |
| 2 | 7 | 15.41612 | 11.18420 | 2.83765 | 3.57211 |
| 3 | 15 | −19.84325 | 0.50000 | 0.27971 | 0.48390 |
| 4 | 17 | 38.85167 | 3.12070 | 1.37482 | 2.70968 |

TABLE 9-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.42847 | −0.64344 | −0.95812 |
| 3 | 15 | 2.64594 | 2.94689 | 3.31036 |
| 4 | 17 | 0.62389 | 0.62390 | 0.62384 |

Numerical Example 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows the various data.

TABLE 10

(Surface data)

| Surface number | r | d | nd | vd |
|---|---|---|---|---|
| Objet surface | ∞ | | | |
| 1 | 59.87210 | 0.80000 | 1.80610 | 40.7 |
| 2 | 11.56140 | 3.73710 | | |
| 3* | 61.35160 | 1.40000 | 1.54360 | 56.0 |
| 4* | 22.28290 | 1.37740 | | |
| 5 | 19.98120 | 1.96990 | 1.84666 | 23.8 |
| 6 | 43.82180 | Variable | | |
| 7* | 14.58890 | 3.05430 | 1.80755 | 40.9 |
| 8* | −62.17980 | 1.76540 | | |
| 9(Diaphragm) | ∞ | 2.04640 | | |
| 10 | −26.76390 | 0.50000 | 1.80610 | 33.3 |
| 11 | 9.60660 | 3.15050 | 1.48749 | 70.4 |
| 12 | −12.99340 | 1.00000 | | |
| 13 | 31.03000 | 1.50000 | 1.68223 | 49.7 |
| 14 | −311.94280 | Variable | | |
| 15 | −45.86680 | 0.60000 | 1.63550 | 23.9 |
| 16 | 16.97420 | Variable | | |
| 17 | 45.44240 | 3.26770 | 1.82692 | 23.3 |
| 18 | −84.94120 | (BF) | | |
| Image surface | ∞ | | | |

TABLE 11

(Aspherical data)

Surface No. 3

K = −1.59426E+01, A4 = −2.69407E−05, A6 = 8.12089E−07,
A8 = −6.33455E−09 A10 = 8.09932E−12
Surface No. 4

K = −3.00000E+00, A4 = −3.56912E−05, A6 = 7.52623E−07,
A8 = −8.64942E−09 A10 = 3.97406E−12
Surface No. 7

K = −1.31930E−01, A4 = −2.08560E−05, A6 = 1.86694E−07,
A8 = −1.72620E−08 A10 = 0.00000E+00
Surface No. 8

K = 2.56731E+00, A4 = 2.16376E−05, A6 = −5.64323E−08,
A8 = −1.60379E−08 A10 = 0.00000E+00

TABLE 12

(Various data)

Zooming ratio 2.79747

| | Wide-angle limit | Middle position | Telephoto limit |
|---|---|---|---|
| Focal length | 14.4894 | 24.2343 | 40.5337 |
| F-number | 3.64030 | 5.40923 | 5.82480 |
| Half view angle | 40.0770 | 24.4200 | 14.7751 |
| Image height | 10.8150 | 10.8150 | 10.8150 |
| Overall length of lens system | 72.1757 | 66.5592 | 70.6916 |
| BF | 14.20054 | 14.19464 | 14.19649 |
| d6 | 22.7454 | 8.8881 | 0.5000 |
| d14 | 1.7859 | 4.6095 | 8.4459 |
| d16 | 7.2752 | 12.6983 | 21.3805 |
| Entrance pupil position | 13.2496 | 10.5115 | 7.8106 |
| Exit pupil position | −25.5581 | −51.8662 | −219.2109 |
| Front principal points position | 22.4585 | 25.8555 | 41.3052 |
| Back principal points position | 57.6864 | 42.3249 | 30.1579 |

Single lens data

| Lens element | Initial surface number | Focal length |
|---|---|---|
| 1 | 1 | −17.9070 |
| 2 | 3 | −65.1936 |
| 3 | 5 | 41.7960 |
| 4 | 7 | 14.8973 |
| 5 | 10 | −8.7161 |
| 6 | 11 | 11.8721 |
| 7 | 13 | 41.4415 |
| 8 | 15 | −19.4232 |
| 9 | 17 | 36.2115 |

Zoom lens unit data

| Lens unit | Initial surface No. | Focal length | Overall length of lens unit | Front principal points position | Back principal points position |
|---|---|---|---|---|---|
| 1 | 1 | −22.30189 | 9.28440 | −0.41386 | 1.09073 |
| 2 | 7 | 16.39774 | 13.01660 | 3.64485 | 4.48799 |
| 3 | 15 | −19.42320 | 0.60000 | 0.26678 | 0.50127 |
| 4 | 17 | 36.21149 | 3.26770 | 0.63054 | 2.08908 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.40500 | −0.61574 | −0.89887 |
| 3 | 15 | 2.78843 | 3.06672 | 3.51401 |
| 4 | 17 | 0.57530 | 0.57546 | 0.57541 |

Numerical Example 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows the various data.

TABLE 13

(Surface data)

| Surface number | r | d | nd | vd |
|---|---|---|---|---|
| Object surface | ∞ | | | |
| 1 | 215.30950 | 0.80000 | 1.72916 | 54.7 |

TABLE 13-continued (Surface data)

| Surface number | r | d | nd | vd |
|---|---|---|---|---|
| 2 | 11.32450 | 4.70440 | | |
| 3* | 25.63460 | 1.92760 | 1.63550 | 23.9 |
| 4* | 53.72320 | Variable | | |
| 5* | 14.10830 | 2.95520 | 1.80755 | 40.9 |
| 6* | −82.93650 | 1.02250 | | |
| 7(Diaphragm) | ∞ | 2.12830 | | |
| 8 | −29.29570 | 0.50000 | 1.80610 | 33.3 |
| 9 | 9.14650 | 3.05420 | 1.51680 | 64.2 |
| 10 | −14.03780 | 1.00000 | | |
| 11 | 27.81630 | 1.50000 | 1.83400 | 37.3 |
| 12 | 113.13360 | Variable | | |
| 13* | −82.73930 | 1.00000 | 1.63550 | 23.9 |
| 14* | 16.03190 | Variable | | |
| 15 | 125.28440 | 2.99410 | 1.84666 | 23.8 |
| 16 | −42.98460 | (BF) | | |
| Image surface | ∞ | | | |

TABLE 14

(Aspherical data)

Surface No. 3

K = 7.03282E−01, A4 = −9.19536E−06, A6 = 6.95522E−07,
A8 = −7.11250E−09 A10 = 2.65621E−11

Surface No. 4

K = 0.00000E+00, A4 = −4.87150E−05, A6 = 5.74271E−07,
A8 = −9.21956E−09 A10 = 2.97866E−11

Surface No. 5

K = 0.00000E+00, A4 = −8.19097E−06, A6 = −1.04169E−06,
A8 = 2.10158E−08 A10 = −6.64784E−10

Surface No. 6

K = 0.00000E+00, A4 = 3.78892E−05, A6 = −1.55547E−06,
A8 = 3.19629E−08 A10 = −8.67234E−10

Surface No. 13

K = 0.00000E+00, A4 = 2.22548E−04, A6 = −1.24649E−05,
A8 = 5.11837E−07 A10 = −9.32953E−09

Surface No. 14

K = 0.00000E+00, A4 = 2.55244E−04, A6 = −1.21377E−05,
A8 = 4.34042E−07 A10 = −7.11501E−09

TABLE 15

(Various data)

Zooming ratio 2.79750

| | Wide-angle limit | Middle position | Telephoto limit |
|---|---|---|---|
| Focal length | 14.4894 | 24.2345 | 40.5342 |
| F-number | 3.64009 | 5.20030 | 5.82531 |
| Half view angle | 39.9267 | 24.1215 | 14.6370 |
| Image height | 10.8150 | 10.8150 | 10.8150 |
| Overall length of lens system | 70.0876 | 64.0710 | 67.9383 |
| BF | 14.22872 | 14.21216 | 14.14689 |
| d4 | 22.6387 | 8.9507 | 0.8200 |
| d12 | 1.7859 | 4.6434 | 8.4459 |
| d14 | 7.8480 | 12.6784 | 20.9392 |
| Entrance pupil position | 12.7380 | 9.7583 | 6.8361 |
| Exit pupil position | −27.5957 | −51.9601 | −182.0551 |
| Front principal points position | 22.2078 | 25.1173 | 38.9961 |
| Back principal points position | 55.5982 | 39.8365 | 27.4041 |

Single lens data

| Lens element | Initial surface number | Focal length |
|---|---|---|
| 1 | 1 | −16.4203 |
| 2 | 3 | 75.1474 |
| 3 | 5 | 15.1366 |
| 4 | 8 | −8.5970 |
| 5 | 9 | 11.2197 |
| 6 | 11 | 43.8762 |
| 7 | 13 | −21.0497 |
| 8 | 15 | 38.1112 |

Zoom lens unit data

| Lens unit | Initial surface No. | Focal length | Overall length of lens unit | Front principal points position | Back principal points position |
|---|---|---|---|---|---|
| 1 | 1 | −22.39611 | 7.43200 | −0.59299 | 0.28391 |
| 2 | 5 | 16.08015 | 12.16020 | 3.15634 | 4.63446 |
| 3 | 13 | −21.04969 | 1.00000 | 0.51018 | 0.90114 |
| 4 | 15 | 38.11118 | 2.99410 | 1.21711 | 2.57652 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.40959 | −0.62884 | −0.92201 |
| 3 | 13 | 2.56545 | 2.79285 | 3.17715 |
| 4 | 15 | 0.61570 | 0.61613 | 0.61784 |

Numerical Example 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows the various data.

TABLE 16

(Surface data)

| Surface number | r | d | nd | vd |
|---|---|---|---|---|
| Object surface | ∞ | | | |
| 1 | 179.49290 | 0.80000 | 1.69680 | 55.5 |
| 2* | 10.60500 | 4.65860 | | |
| 3 | 17.94000 | 2.28930 | 1.63550 | 23.9 |
| 4* | 29.75540 | Variable | | |
| 5* | 12.65730 | 2.04410 | 1.80755 | 40.9 |
| 6* | −124.32380 | 1.02250 | | |
| 7(Diaphragm) | ∞ | 2.12830 | | |
| 8 | −35.04530 | 0.50000 | 1.80610 | 33.3 |
| 9 | 8.56570 | 2.65520 | 1.48749 | 70.4 |
| 10 | −14.08030 | 1.00000 | | |
| 11 | 29.64130 | 1.50000 | 1.80420 | 46.5 |
| 12 | 239.65770 | Variable | | |
| 13 | −88.70010 | 0.60000 | 1.68893 | 31.2 |
| 14 | 14.94850 | Variable | | |

TABLE 16-continued (Surface data)

| Surface number | r | d | nd | vd |
|---|---|---|---|---|
| 15 | 47.30530 | 3.49480 | 1.90366 | 31.3 |
| 16 | −78.46680 | (BF) | | |
| Image surface | ∞ | | | |

TABLE 17

(Aspherical data)

Surface No. 2

K = −1.68661E+00, A4 = 1.44302E−04, A6 = 2.63758E−07,
A8 = −4.46067E−09 A10 = 3.62473E−11

Surface No. 4

K = −1.68690E+00, A4 = −1.47342E−05, A6 = −7.88699E−08,
A8 = 1.80175E−09 A10 = −1.76479E−11

Surface No. 5

K = 4.07085E−02, A4 = −3.95405E−05, A6 = 4.61690E−06,
A8 = −2.21353E−07 A10 = 4.44629E−09

Surface No. 6

K = 0.00000E+00, A4 = 2.04089E−05, A6 = 4.63968E−06,
A8 = −2.39904E−07 A10 = 5.04869E−09

TABLE 18

(Various data)

Zooming ratio 2.79740

| | Wide-angle limit | Middle position | Telephoto limit |
|---|---|---|---|
| Focal length | 14.4891 | 24.2335 | 40.5318 |
| F-number | 3.64044 | 5.20117 | 5.82525 |
| Half view angle | 39.9487 | 24.3437 | 14.7231 |
| Image height | 10.8150 | 10.8150 | 10.8150 |
| Overall length of lens system | 69.5601 | 63.5595 | 67.4110 |

TABLE 18-continued (Various data)

| | | | |
|---|---|---|---|
| BF | 14.21116 | 14.20067 | 14.20108 |
| d4 | 22.7990 | 9.0451 | 0.8200 |
| d12 | 1.7859 | 4.5762 | 8.3453 |
| d14 | 8.0712 | 13.0447 | 21.3518 |
| Entrance pupil position | 12.9137 | 9.7924 | 6.6821 |
| Exit pupil position | −28.5478 | −59.2863 | −412.0828 |
| Front principal points position | 22.4931 | 26.0345 | 43.3600 |
| Back principal points position | 55.0710 | 39.3260 | 26.8792 |

Single lens data

| Lens element | Initial surface number | Focal length |
|---|---|---|
| 1 | 1 | −16.2068 |
| 2 | 3 | 66.1150 |
| 3 | 5 | 14.3172 |
| 4 | 8 | −8.4955 |
| 5 | 9 | 11.3615 |
| 6 | 11 | 41.9267 |
| 7 | 13 | −18.5250 |
| 8 | 15 | 33.0959 |

Zoom lens unit data

| Lens unit | Initial surface No. | Focal length | Overall length of lens unit | Front principal points position | Back principal points position |
|---|---|---|---|---|---|
| 1 | 1 | −22.67476 | 7.74790 | −0.40761 | 0.75866 |
| 2 | 5 | 15.53887 | 10.85010 | 2.47909 | 3.67499 |
| 3 | 13 | −18.52503 | 0.60000 | 0.30330 | 0.54888 |
| 4 | 15 | 33.09587 | 3.49480 | 0.69972 | 2.33415 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.39436 | −0.60582 | −0.89180 |
| 3 | 13 | 3.02567 | 3.29217 | 3.74067 |
| 4 | 15 | 0.53554 | 0.53585 | 0.53584 |

The following Table 19 shows the corresponding values to the individual conditions in the zoom lens systems of each of Numerical Examples.

TABLE 19

(Values corresponding to conditions)

| | Condition | Numerical Example | | | | | |
|---|---|---|---|---|---|---|---|
| | | 1 | 2 | 3 | 4 | 5 | 6 |
| (1) | $|(1 - (\beta_{3T})^2) \times (\beta_{4T})^2|$ | 3.762 | 3.843 | 3.877 | 3.752 | 3.473 | 3.733 |
| (2) | $Bf_W/f_W$ | 0.980 | 0.980 | 0.980 | 0.980 | 0.982 | 0.981 |
| (3) | $vd_3$ | 29.500 | 39.500 | 31.000 | 23.890 | 23.890 | 31.200 |
| (4) | $|M_3/f_W|$ | 0.910 | 0.962 | 0.910 | 0.973 | 0.903 | 0.916 |
| (5) | $f_2/f_W$ | 1.088 | 1.053 | 1.064 | 1.132 | 1.110 | 1.072 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

Also, the present disclosure is applicable to, among the interchangeable lens apparatuses according to the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system, in order from an object side to an image side, comprising:
a first lens unit having negative optical power;
a second lens unit having positive optical power;
a third lens unit having negative optical power; and
a fourth lens unit having positive optical power, wherein
the first lens unit, the second lens unit, and the third lens unit move along an optical axis in zooming from a wide-angle limit to a telephoto limit at a time of image taking,
the third lens unit moves along the optical axis in focusing from an infinity in-focus condition to a close-object in-focus condition, and
the following conditions (1) and (2) are satisfied:

$$2.5 \leq |(1-(\beta_{3T})^2) \times (\beta_{4T})^2| \leq 7.0 \quad (1)$$

$$0.5 \leq Bf_W/f_W \leq 4.0 \quad (2)$$

where
$\beta_{3T}$ is a lateral magnification of the third lens unit at an infinite object point distance, at the telephoto limit,
$\beta_{4T}$ is a lateral magnification of the fourth lens unit at an infinite object point distance, at the telephoto limit,
$Bf_W$ is a back focal length of the zoom lens system at the wide-angle limit, and
$f_W$ is a focal length of the zoom lens system at the wide-angle limit.

2. The zoom lens system as claimed in claim 1, wherein the following condition (5) is satisfied:

$$0.7 < f_2/f_W \leq 1.4 \quad (5)$$

where
$f_2$ is a focal length of the second lens unit, and
$f_W$ is the focal length of the zoom lens system at the wide-angle limit.

3. The zoom lens system as claimed in claim 1, wherein a part or entirety of the second lens unit moves in a direction perpendicular to the optical axis to optically compensate image blur.

4. The zoom lens system as claimed in claim 1, wherein at least one lens element among lens elements constituting the first lens unit and lens elements constituting the third lens unit is made of a resin material.

5. The zoom lens system as claimed in claim 1, wherein an aperture diaphragm is placed in the second lens unit, and the aperture diaphragm moves along the optical axis together with the second lens unit in zooming from the wide-angle limit to the telephoto limit at the time of image taking.

6. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

7. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

8. A zoom lens system, in order from an object side to an image side, comprising:
a first lens unit having negative optical power;
a second lens unit having positive optical power;
a third lens unit having negative optical power; and
a fourth lens unit having positive optical power, wherein
the third lens unit is composed of one lens element,
the first lens unit, the second lens unit, and the third lens unit move along an optical axis in zooming from a wide-angle limit to a telephoto limit at a time of image taking,
the third lens unit moves from the object side to the image side along the optical axis in focusing from an infinity in-focus condition to a close-object in-focus condition, and
the following conditions (2), (3), and (4) are satisfied:

$$0.5 \leq Bf_W/f_W \leq 4.0 \quad (2)$$

$$\nu d_3 \leq 40.0 \quad (3)$$

$$0.3 \leq |M_3/f_W| \leq 1.3 \quad (4)$$

where
$Bf_W$ is a back focal length of the zoom lens system at the wide-angle limit,
$\nu d_3$ is an Abbe number to a d-line of the lens element constituting the third lens unit,
$M_3$ is an amount of movement of the third lens unit in zooming from the wide-angle limit to the telephoto limit at the time of image taking, and
$f_W$ is a focal length of the zoom lens system at the wide-angle limit.

9. The zoom lens system as claimed in claim 8, wherein the following condition (5) is satisfied:

$$0.7 < f_2/f_W < 1.4 \quad (5)$$

where
$f_2$ is a focal length of the second lens unit, and
$f_W$ is the focal length of the zoom lens system at the wide-angle limit.

10. The zoom lens system as claimed in claim 8, wherein a part or entirety of the second lens unit moves in a direction perpendicular to the optical axis to optically compensate image blur.

11. The zoom lens system as claimed in claim 8, wherein at least one lens element among lens elements constituting the first lens unit and the lens element constituting the third lens unit is made of a resin material.

12. The zoom lens system as claimed in claim 8, wherein an aperture diaphragm is placed in the second lens unit, and the aperture diaphragm moves along the optical axis together with the second lens unit in zooming from the wide-angle limit to the telephoto limit at the time of image taking.

13. An interchangeable lens apparatus comprising:
the zoom lens system as claimed in claim 8; and
a lens mount section which is connectable to a camera body including an image sensor for receiving an optical image formed by the zoom lens system and converting the optical image into an electric image signal.

14. A camera system comprising:
an interchangeable lens apparatus including the zoom lens system as claimed in claim 8; and
a camera body which is detachably connected to the interchangeable lens apparatus via a camera mount section, and includes an image sensor for receiving an optical image formed by the zoom lens system and converting the optical image into an electric image signal.

\* \* \* \* \*